United States Patent [19]
Burch et al.

[11] Patent Number: 5,749,777
[45] Date of Patent: May 12, 1998

[54] SLABBING APPARATUS AND METHOD

[75] Inventors: Ronald H. Burch, Harahan; Warren E. Cancienne, Jr., River Ridge; Somsak S. Rodboon, Kenner; Eric W. Morales, New Orleans, all of La.

[73] Assignee: The Laitram Corporation, Harahan, La.

[21] Appl. No.: 457,820

[22] Filed: Jun. 1, 1995

[51] Int. Cl.$^6$ ........................................ A22C 25/18
[52] U.S. Cl. ................ 452/149; 452/155; 452/161; 452/170
[58] Field of Search .................... 452/149, 155, 452/157, 170, 161, 160

[56] References Cited

U.S. PATENT DOCUMENTS

| | | | |
|---|---|---|---|
| 1,507,259 | 9/1924 | Smith | 452/149 |
| 2,541,442 | 2/1951 | Skoog | 452/149 |
| 3,319,284 | 5/1967 | Schlichting | 452/170 |
| 3,593,370 | 7/1971 | Lapeyre . | |
| 3,594,191 | 7/1971 | Lapeyre | 432/155 |
| 4,557,019 | 12/1985 | Van Devanter et al. . | |
| 4,726,094 | 2/1988 | Braeger . | |
| 4,817,245 | 4/1989 | Melville | 452/149 |
| 4,868,951 | 9/1989 | Akesson et al. . | |
| 5,061,221 | 10/1991 | Holzhuter et al. | 452/184 |
| 5,181,879 | 1/1993 | Lapeyre et al. | 452/160 |

FOREIGN PATENT DOCUMENTS

| | | | |
|---|---|---|---|
| 6278087 | 10/1994 | Japan | A22C 25/18 |
| 1685354 | 10/1991 | U.S.S.R. | 452/149 |
| 889787 | 2/1962 | United Kingdom . | |

OTHER PUBLICATIONS

Derwent World Patent Index database entry of above foreign patent document including translation of Title and Abstract.

Primary Examiner—Willis Little
Attorney, Agent, or Firm—James T. Cronvich

[57] ABSTRACT

Apparatus and method for automatically subdividing carcasses, especially fish bodies, into individual slab sections. A preferred embodiment of the cutting apparatus includes a feed mechanism and a cutting mechanism coordinated by computer. The feed mechanism comprises a motor-driven carriage that rides upon rails. Between the rails is a feed track formed by parallel guides having angled facing surfaces defining a channel to accommodate a fish body aligned along the channel. A retainer on the carriage secures the head end of the fish body so that it can be advanced along the channel by the carriage without a change in orientation. The cutting mechanism includes a reciprocating blade that is advanced in a direction to define a cutting plane intersecting the path the fish body takes as it is transported by the carriage beyond the end of the feed track. Holding blocks at the end of the feed track clamp the fish body securely in position for cutting. The blade slices through the stationary fish body to sever a slab section from one end with minimal kerf loss and shredding. A slab holder is inserted in the peripheral girth of the severed slab section before both are conveyed off. The process is repeated until the fish body is subdivided into a predetermined number of slab sections with each of the severed slab sections held by its own holder in the same relative location so that the general orientation of the severed slab can be determined in downstream processing by reference to the holder.

39 Claims, 16 Drawing Sheets

SLABBING APPARATUS AND METHOD

BACKGROUND

The invention relates to the butchering of carcasses and, more particularly to apparatus and methods for automatically subdividing carcasses, especially fish bodies, into individual slab sections for further processing.

In the canned fish industry, canned fish products are available in a variety of grades. Tuna processors, for example, sell canned tuna in grades such as flake, chunk, or solid-pack, in order of increasing size of the individual sections of fish packed in the can. Because a premium can be charged for the more desirable solid-pack, tuna processors are interested in producing larger individual sections of cannable tuna.

Butchering of tuna is largely a manual operation. Fish are typically tempered, eviscerated, skinned, deboned, and otherwise processed by hand. Before the fish are skinned and deboned, they are usually precooked. Precooking softens the meat, which then comes apart more readily for easier removal of the skin, bones, and other components. Because a loss of even 1% in yield can translate into lost revenues of millions of dollars per year to a large tuna processor, yield is a crucial issue.

Shortcomings with the traditional manual processing of tuna have long been recognized. Among the solutions proposed is that of J. M. Lapeyre in U.S. Pat. No. 3,593,370, issued Jul. 22, 1979, in which he suggests that the tuna fish body, while frozen, be subdivided into individual slabs. In the Lapeyre method, the slabs are cut to a thickness commensurate with the depth of the tuna can. Automatic processing incorporating a video imaging system is used to clean the raw slabs.

In U.S. Pat. No. 5,181,879, issued Jan. 26, 1993, Lapeyre and his co-inventors describe an apparatus for subdividing frozen tuna bodies into transverse sections for further processing. The apparatus includes a series of workstations, each having saw blades positioned at the same elevation and cutting in a horizontal plane. A carriage that rides along a runway spanning the workstations holds a solidly frozen fish body suspended vertically by its head. The runway declines between workstations by a distance equal to the thickness of the slabs to be cut. As the fish body is moved from station to station, it is lowered so that a series of transverse fish body sections are cut beginning with a cut at the tail area and ending with a cut just below the head. The resulting frozen slabs cut away from the body are collected for further processing.

Although the Lapeyre et al. apparatus works well with hard frozen fish bodies, it is not without shortcomings. First, the saw blade causes a significant kerf, which decreases yield. Second, the saw cut shreds the fish muscle fibers along the cut surface. The resulting shredded surface, which thaws somewhat during cutting, tends to refreeze with a cover of frost. This frost cover on the cut surface diminishes visual contrast between the red meat portions and the light-colored loin portions of the slab section. Good contrast is needed for developing high-quality video images of the slab for automated subdivision of the slabs into loin segments, as described in U.S. Pat. No. 4,847,954 to J. M. Lapeyre et al. Poor images result in inaccurate cutting, which affects both quality and yield. Third, the fish must be frozen solid for the Lapeyre et al. apparatus to cut accurately and straight. During offloading, storage, or transport, the fish body is likely to thaw somewhat, even to a semi-frozen state. Unless the fish body is frozen solid, the flesh flexes as the fish body is advanced through the blades, which will not cut a planar path through the fish. The resulting uneven slabs are more difficult to vision properly and process. Fourth, the apparatus is inflexible in its layout. For instance, it is not designed for cutting a wide range of fish lengths without adjustment. Long fish require more cuts than short fish. More cuts require more cutting stations. For this reason, fish must be size-graded before the cutting apparatus is used. After a batch of fish of one grade is slabbed, a workstation can be eliminated or added to cut a batch of the next grade. Furthermore, adjusting the thickness of slabs requires that the decline between successive workstations be adjusted. Such adjustments are time-consuming. Finally, the apparatus has no provisions for controlling the orientation of the slab sections after cutting and prior to subsequent processing steps. In the absence of control over the orientation of the slab section, significantly more intelligence (e.g., manual intervention or more sophisticated and slow computer visioning and tool control programs) is required to regain control of the orientation of the slab to rapidly vision the slab surfaces for automated butchering.

For the foregoing reasons, there is a need for a slabbing apparatus that can automatically subdivide a carcass, such as a fish body, into a plurality of slab sections in preparation for further automated processing. The slabbing apparatus needs to be easy to adjust for a variety of carcass sizes and slab thicknesses, to cut cleanly with little shredding and kerf loss, and to maintain control of the orientation of the slabs after they are severed from the carcass.

SUMMARY

An improved fish cutting apparatus for subdividing a fish body into slab sections satisfies this need. The cutting apparatus includes a feed track mounted on a supporting frame and defining a feed axis. The feed track accommodates a fish body aligned with its long axis along a transport path defined by the track. A cutting mechanism at an end of the feed track cuts along a cutting plane that crosses the transport path. The cutting apparatus further provides means for sequentially transporting the fish body in preselected increments along the feed track into a stationary cutting position intersecting the cutting plane. The cutting apparatus coordinates the cutting mechanism with the sequential transport of the fish body along the feed track. In this way, the cutting mechanism can slice individual slabs from the end of the stationary fish body when it has been moved into the cutting position.

In a preferred embodiment, the cutting apparatus is used for cutting slabs from hard frozen or soft or partly frozen fish bodies. With the cutting plane oriented perpendicular to the transport path, transverse slabs are cut from the fish body. With the cutting apparatus adjusted to transport the fish body a uniform distance along the track between cuts, slabs of uniform thickness are cut from the fish body.

The cutting mechanism preferably includes a smooth-edged blade, which may have one or two cutting edges and may be operated to cut in one or both directions. The blade is reciprocated in the cutting plane by, for example, a motor, an air cylinder, or a high-speed ultrasonic transducer. Such a blade slices, rather than saws, through the fish body to minimize kerf loss. In one version employing motor-driven reciprocation, a linkage coupling the shaft of the motor to the blade converts the rotational motion of the motor shaft to reciprocating motion of the blade in the cutting plane. Holding clamps on opposite sides of the blade restrain the fish body against movement due to the reciprocating motion of the blade and ensure straight, planar cuts through even partly frozen fish bodies.

The cutting mechanism includes means for raising and lowering the blade along the cutting plane. The blade is connected to the means for raising and lowering the blade in such a way as to enable it to slide with respect to the means for raising and lowering. In this way, reciprocation of the blade is independent of blade advancement along the cutting plane.

In one version of the feed track, it is formed of a pair of parallel, spaced apart guides attached to a flat base. The guides form a channel that accommodates a fish body. Preferably, facing surfaces of the guides angle upward and outward from the base to form a truncated V-shaped channel. In another version, the feed track is formed of an inverted V-shaped block adapted to mate with a slot cut in the belly side of the fish body in removing the viscera.

Another version of the cutting apparatus has a pair of rails attached to the frame and parallel to the track. A toothed rack is also attached to the frame and parallel to the track. A carriage that includes a motor and a pinion gear driven by the motor transports the fish body along the track. The motor advances the carriage along the rails by means of the engaged rack and pinion gears.

In yet another version, a fish end retainer, movable with the means for transporting, includes a faceplate designed to abut an end of the fish body, a cradle supporting the underside of the end of the fish body, and an opposing adjustable holddown for securely holding the end of the fish body to the transport means.

In another version the cutting apparatus includes means for attaching a slab holder to the slabs cut from the fish body at substantially the same relative position on all slabs.

Sensors, such as proximity switches and light or infrared transmitters and receivers, are used to sense an end of the fish body when, for instance, the fish body is at a known "home" position along the track. Another sensor at a known distance from the "home" position is used to sense the other end of the fish body along the track. A programmable computer uses information from the sensors to measure the length of the fish body to determine the number of slabs that can be cut from the fish body and to coordinate the transport of the fish body with the cutting mechanism to produce slabs of the desired thickness regardless of the length of the fish body.

A cutting method associated with the apparatus of the invention includes the steps of: loading a fish body into longitudinal alignment along a transport path; transporting the fish body along the transport path into a stationary position; advancing a cutting blade along a cutting plane intersecting the stationary fish body in the cutting position to sever a slab section from the fish body; carrying the severed slab section away from the cutting position in a known orientation; and repeating the steps of transporting the remainder of the fish body into the cutting position, advancing the blade to sever a slab section, and carrying the severed slab away until the fish body is subdivided into a predetermined number of slab sections.

Other optional method steps include: measuring the fish body and determining the number of slabs into which it can be subdivided; routing the first slab section (e.g., the tail) and the remainder of the fish body (e.g., the head) after all the slabs have been severed to different processing stations from that of the other slab sections; attaching a slab holder to the severed slab sections after cutting at the same relative position on all the slabs; positioning holders at least partly around the fish body in the vicinity of the cutting plane during cutting to support the fish body as the slab is severed and releasing the holders after the slab is severed; securing one end of the fish body to a carriage for transporting the fish body along the transport path; and transporting the fish body along the path in uniform increments so that the fish body is subdivided into slab sections of uniform thickness.

DRAWINGS

These and other features, aspects, and advantages of the invention will become better understood by reference to the following description, appended claims, and accompanying drawings, in which:

Figure 2:
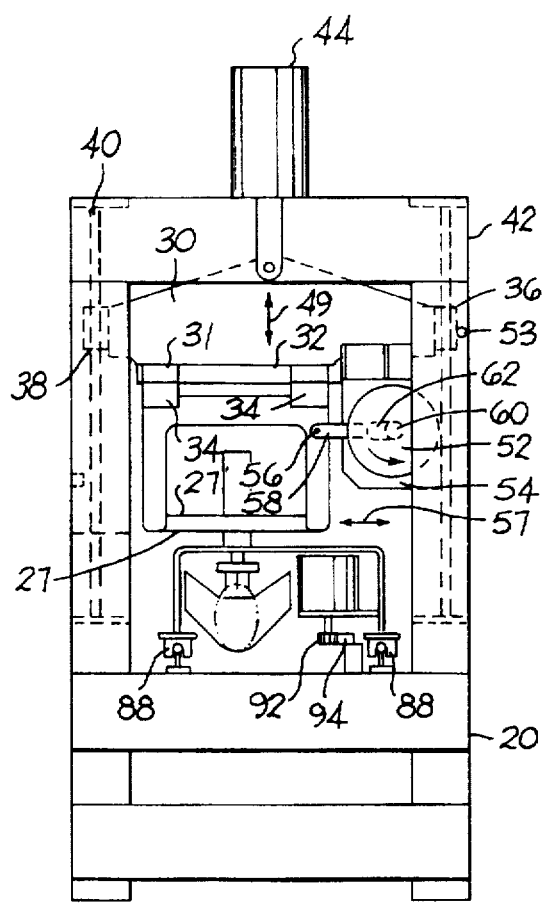
FIG. 2 is an end elevational view of one version of the cutting apparatus of the invention with the blade assembly in a raised position.
Figure 3:
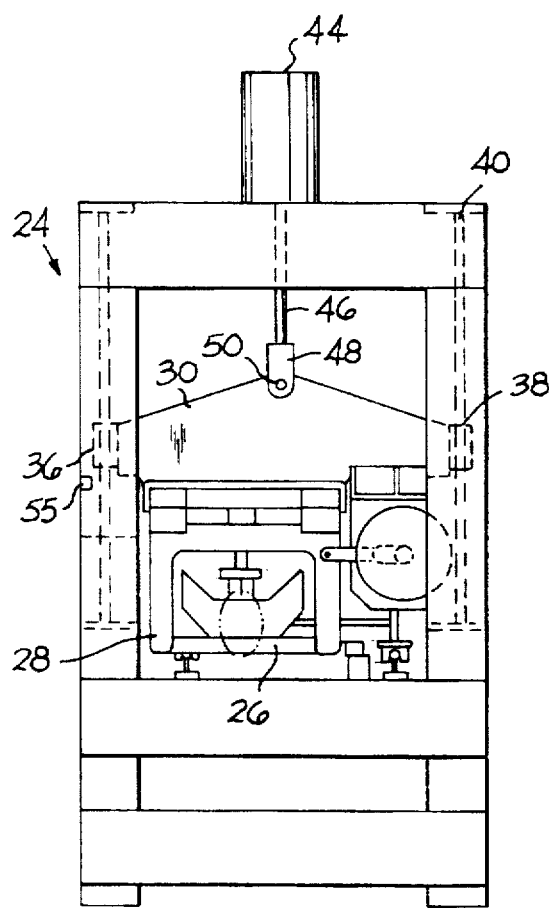
FIG. 3 is an end elevational view as in FIG. 2 with the blade assembly in a lowered position.
Figure 10:
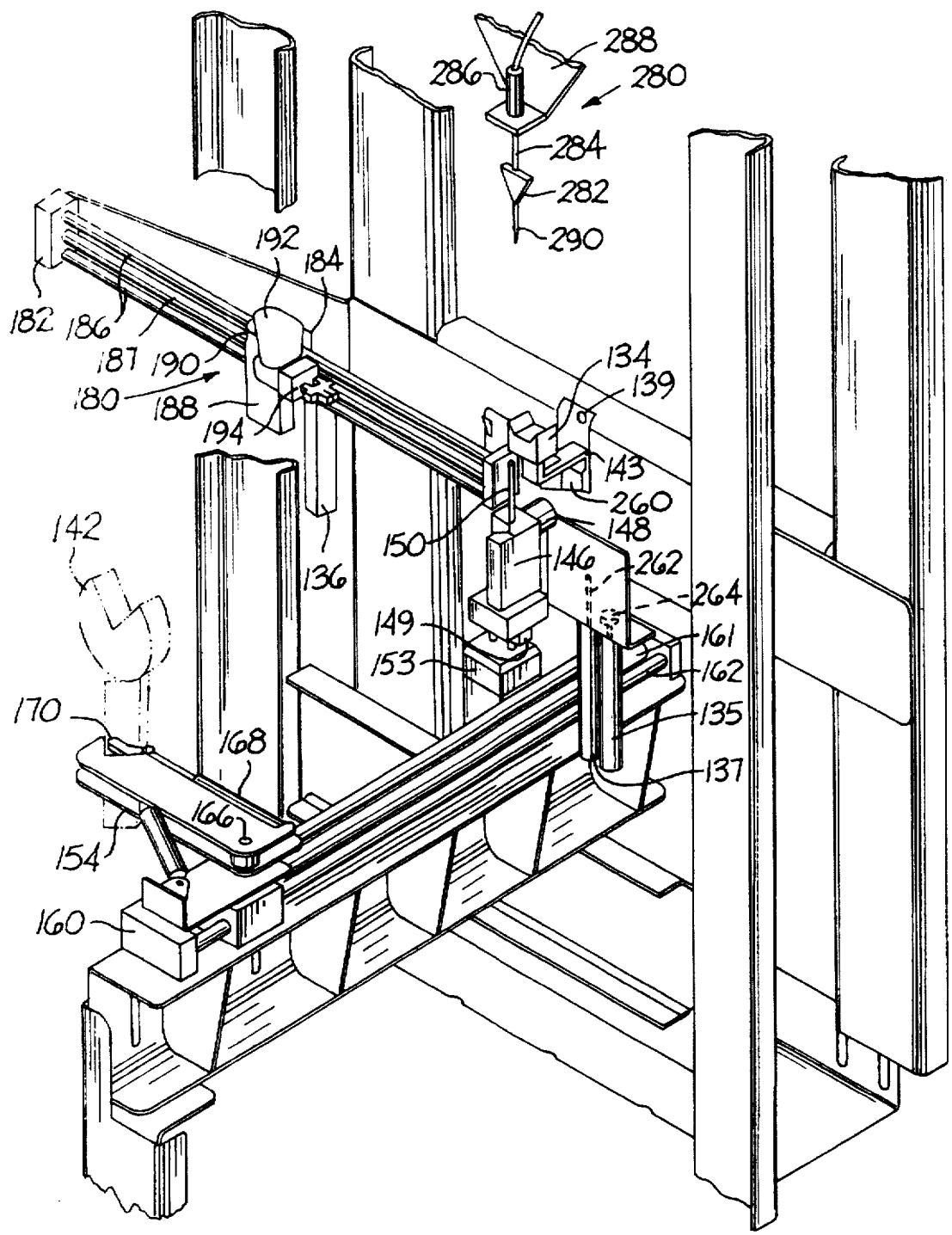
Figure 11:
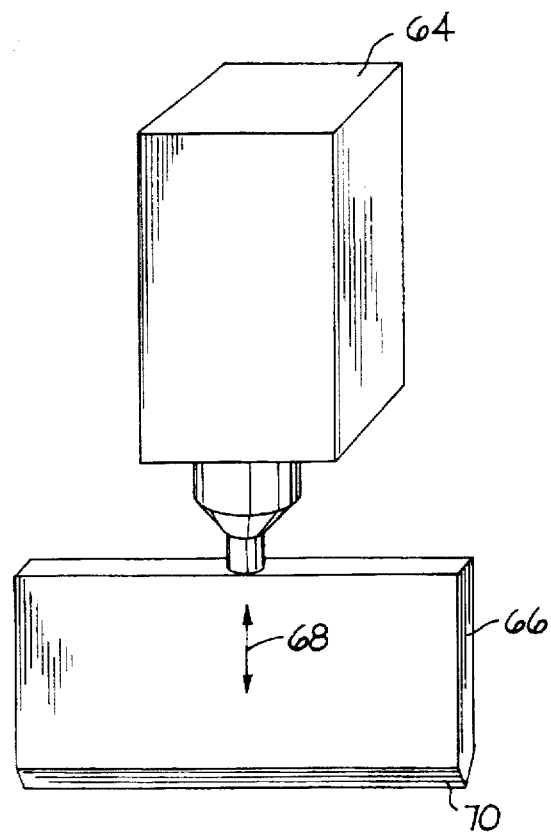
Figure 18:
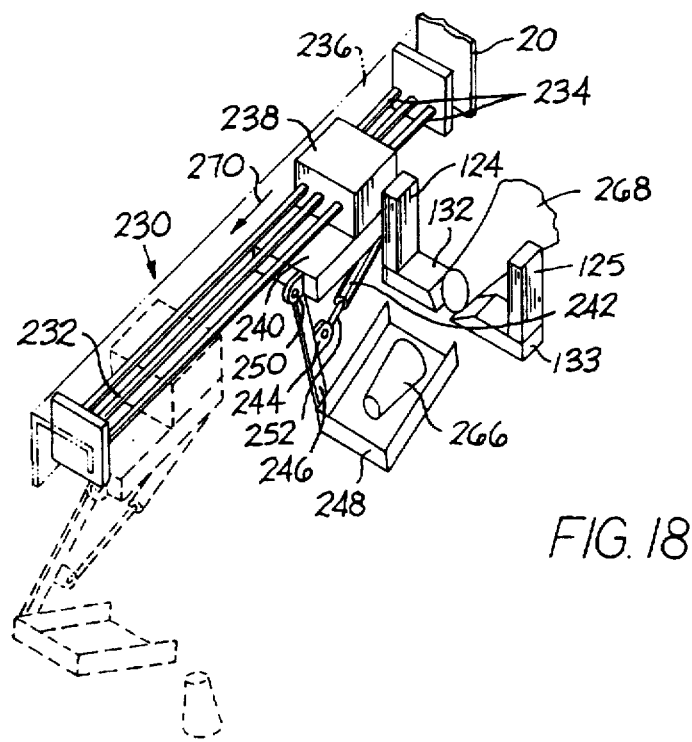
Figure 12:
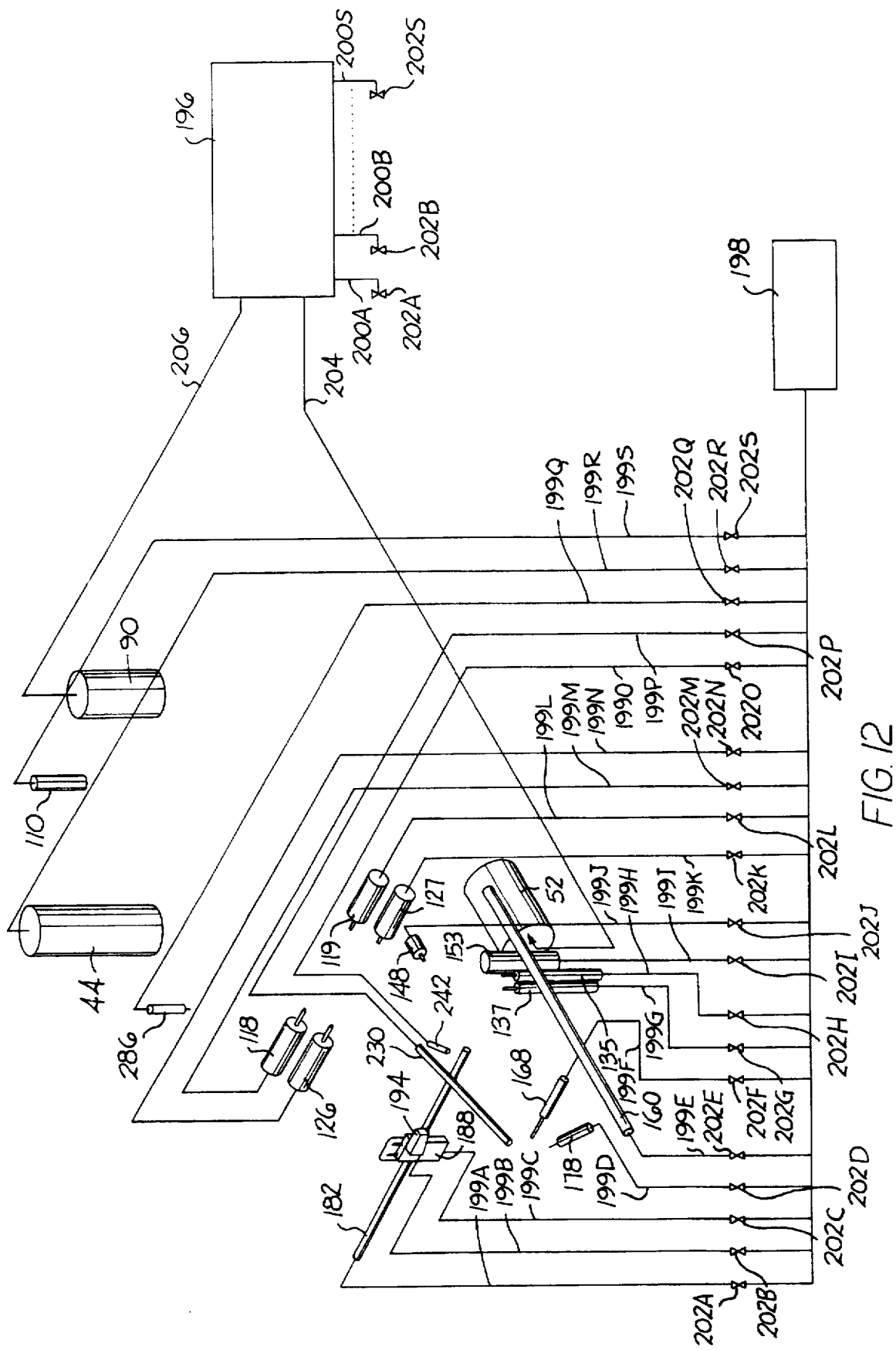
Figure 13:
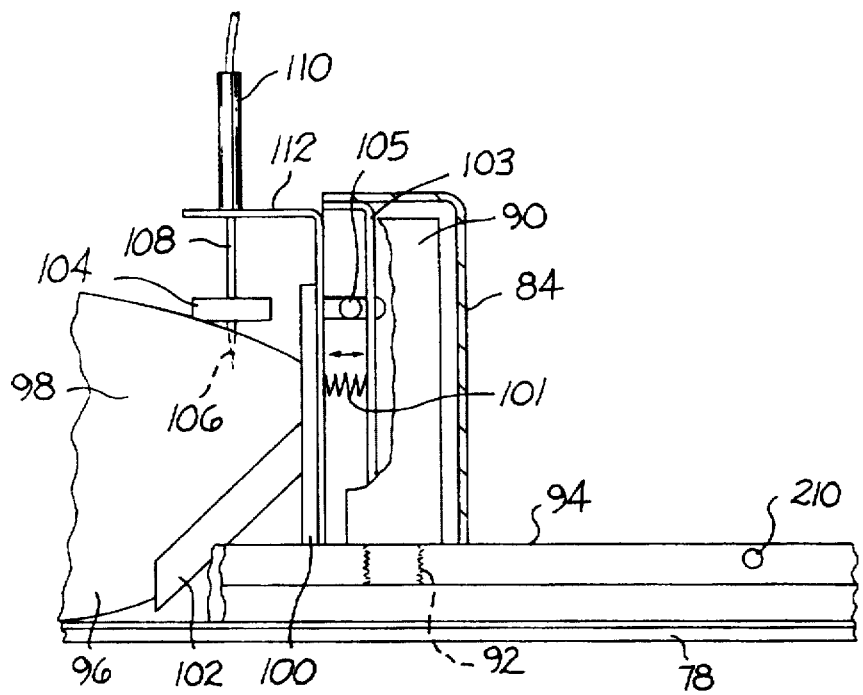
Figure 16:
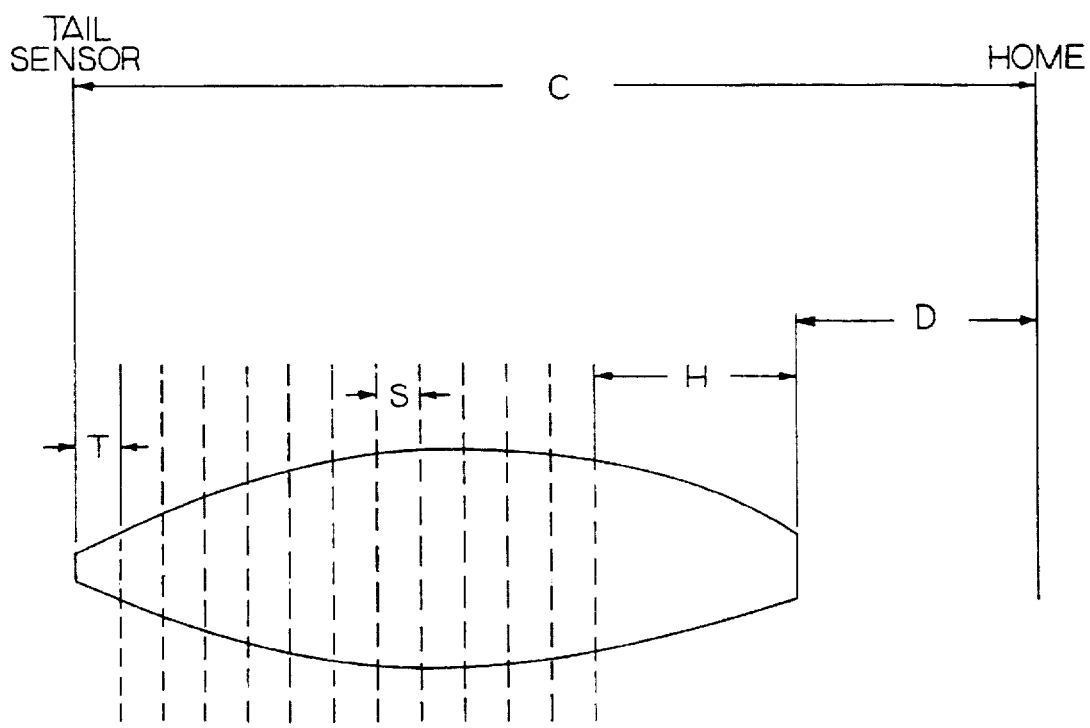
Figure 14:
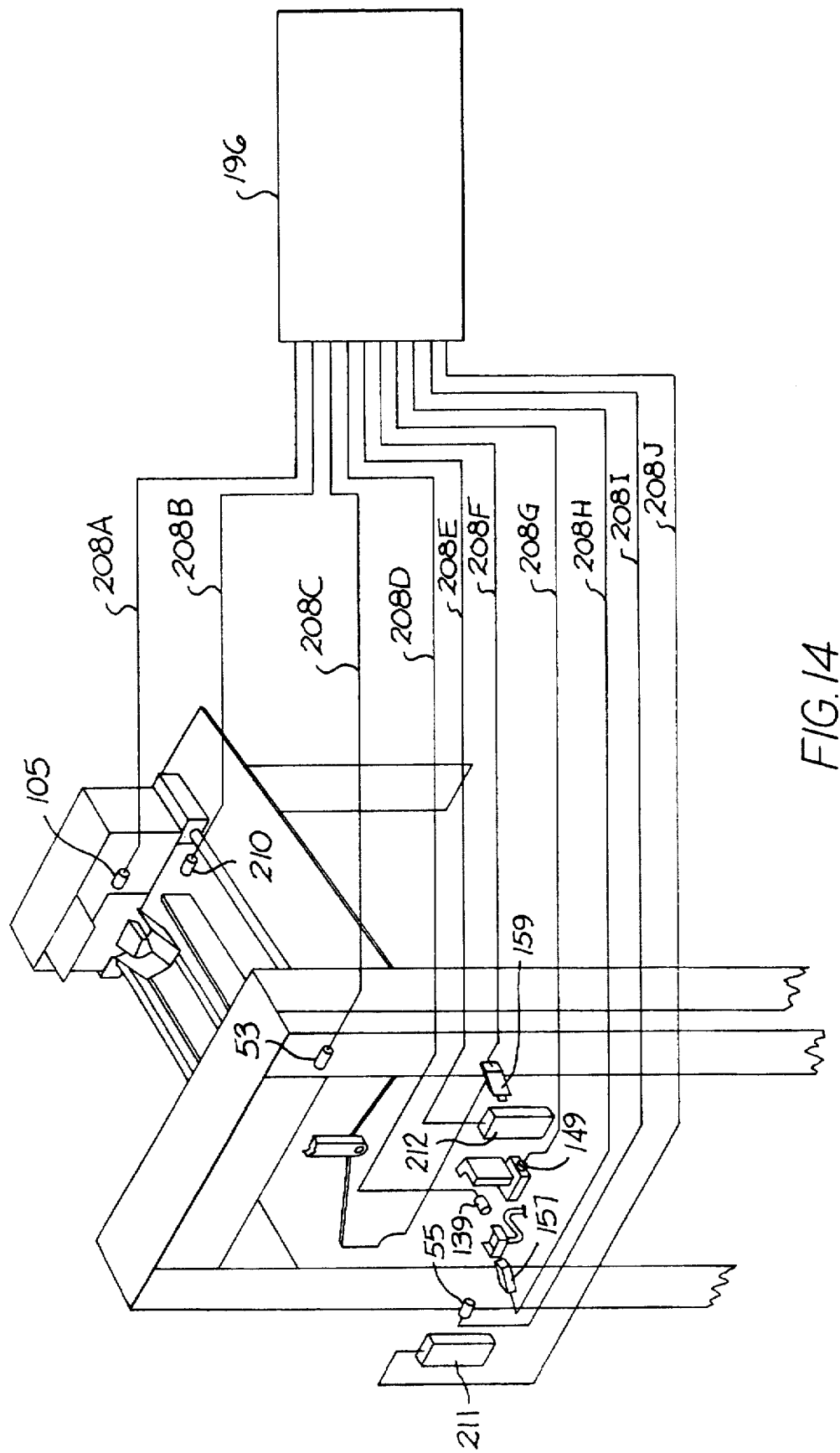
Figure 15A:
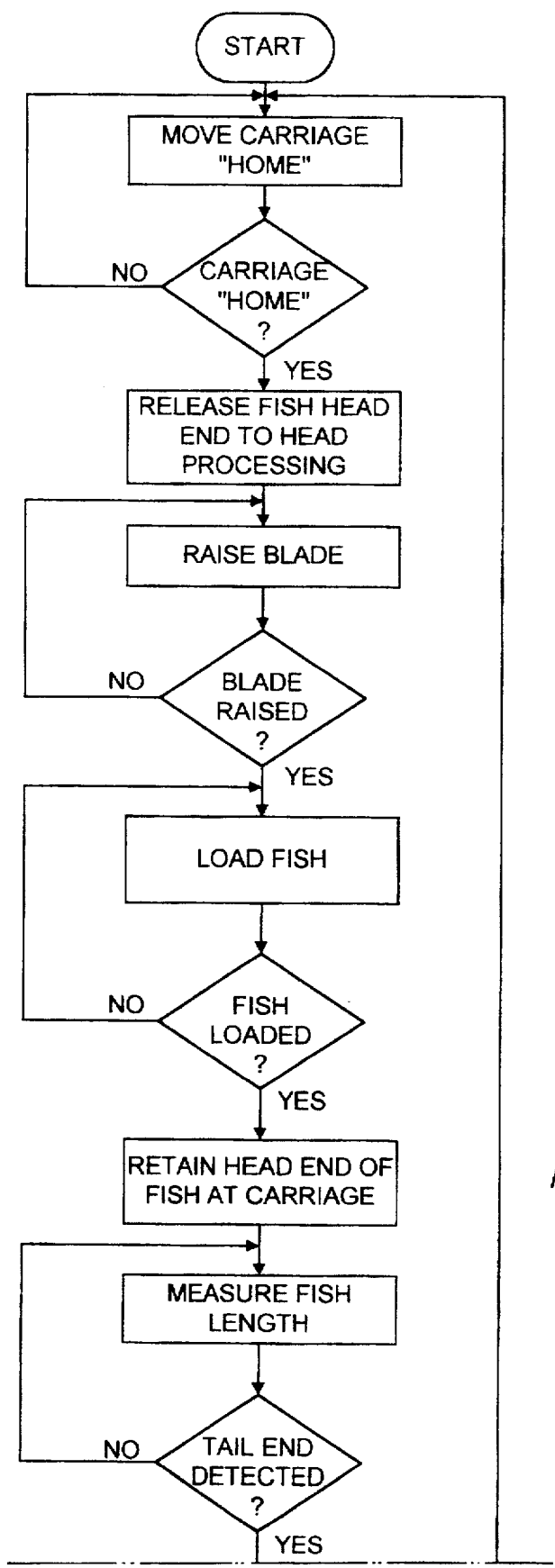
Figure 15B:
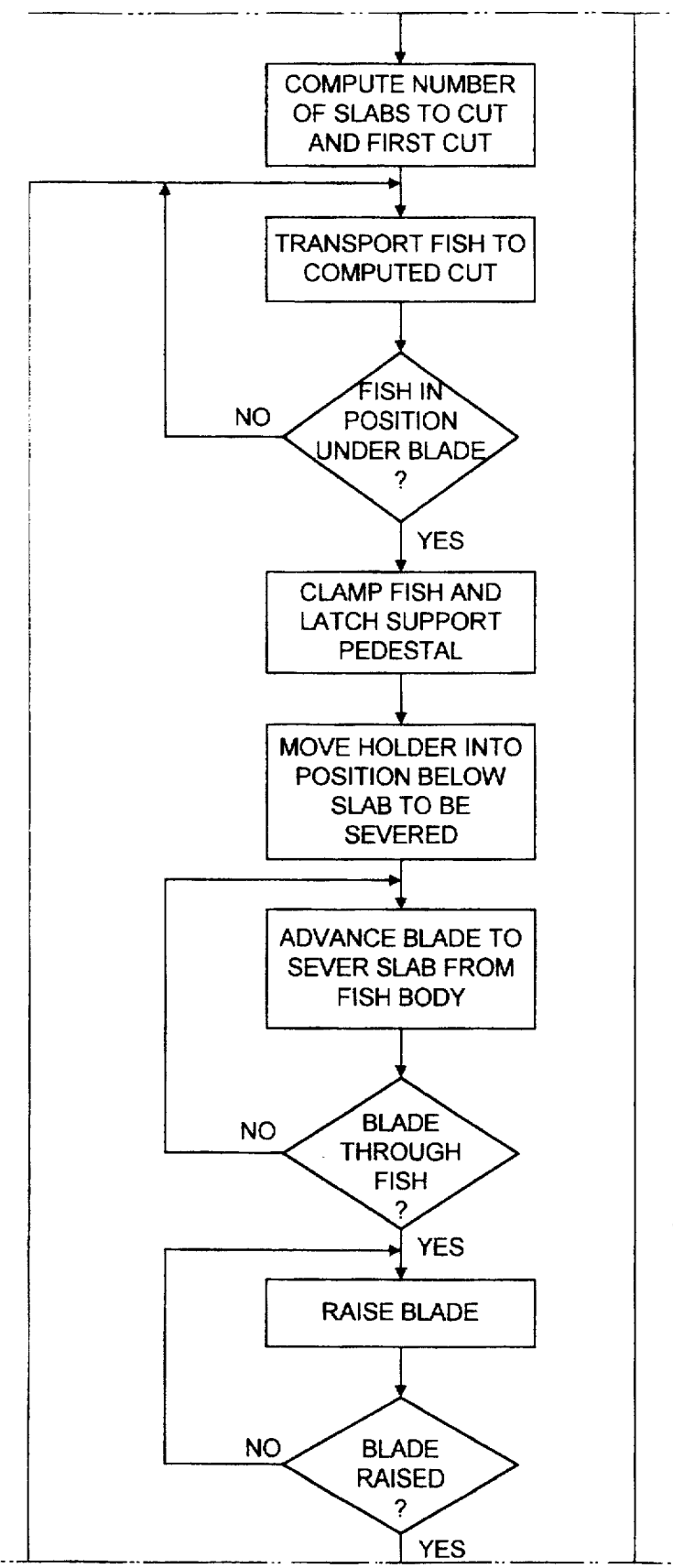
Figure 15C:
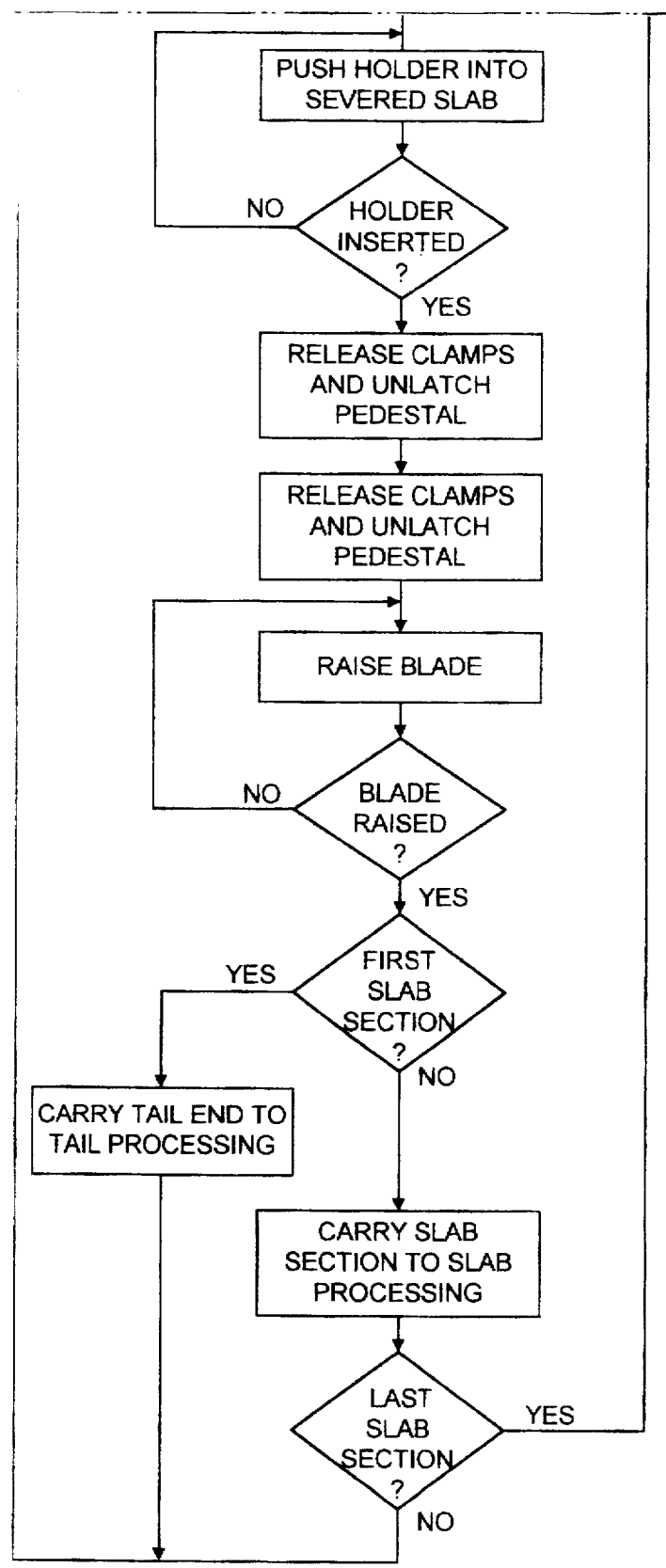
Figure 17:
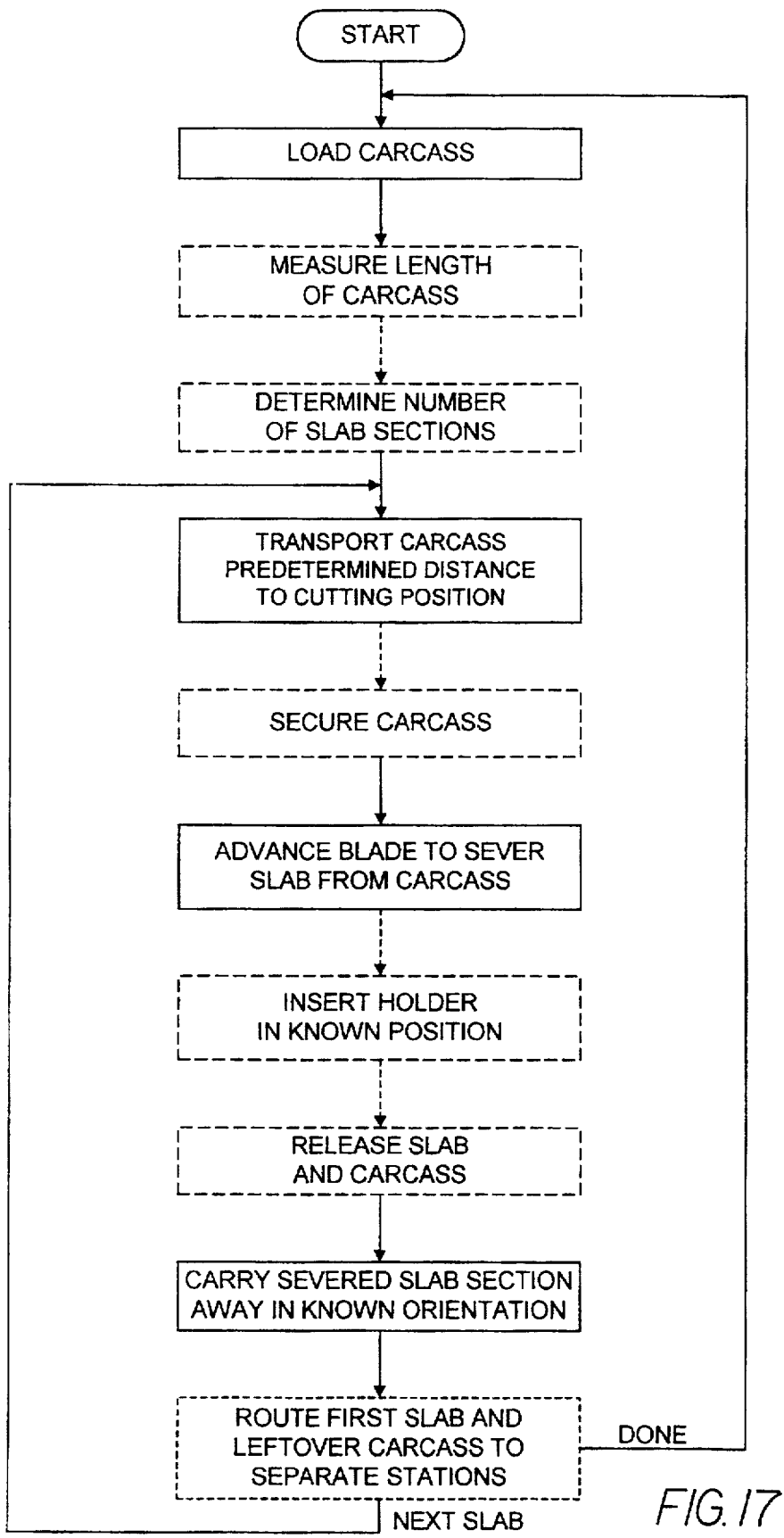
Figure 19:
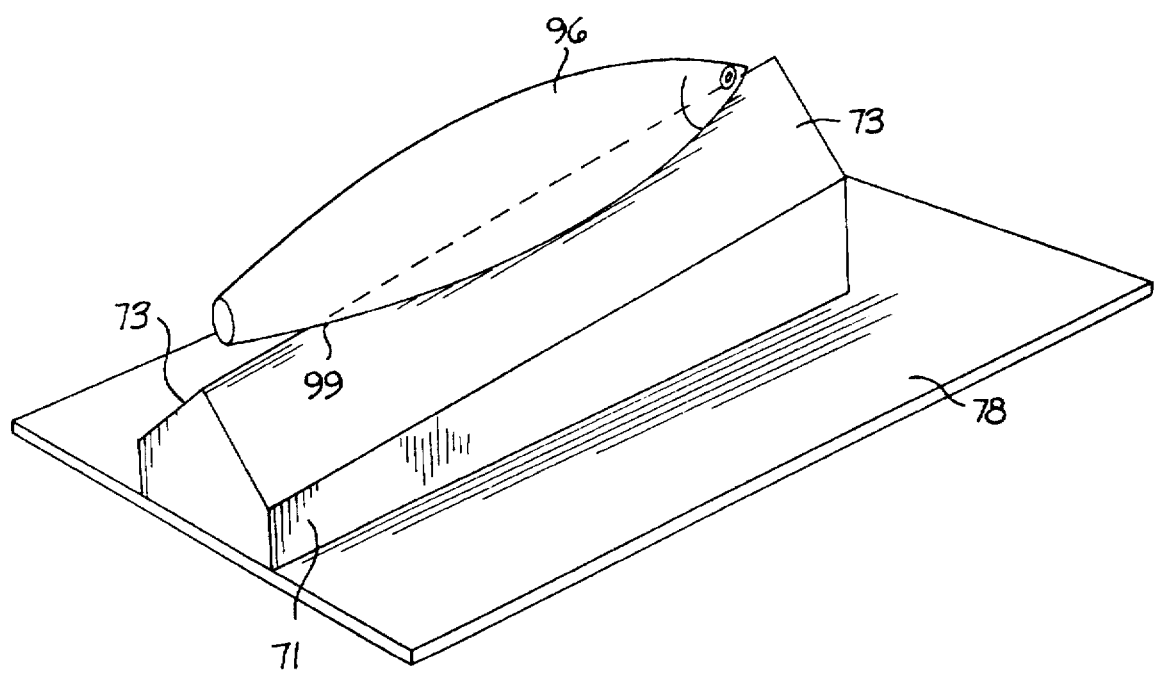

FIGS. 9A–E are fragmentary perspective views of one version of the slab holder insertion and grabber mechanisms used with the cutting apparatus of FIG. 2, showing the sequence of holder insertion and severed slab removal;

FIG. 10 is a fragmentary perspective view of slab holder handling mechanisms of the cutting apparatus of FIG. 2;

FIG. 11 is a perspective view of an alternative version of the cutting mechanism of the invention using an ultrasonic transducer to reciprocate the blade;

FIG. 12 is a hybrid diagram, part schematic and part perspective, of an air cylinder pneumatic network, motors, and electrical and air lines as controlled by computer in the cutting apparatus of FIG. 2;

FIG. 13 is a partial cutaway side elevational view of the carriage assembly of the cutting apparatus of FIG. 2;

FIG. 14 is a hybrid diagram as in FIG. 12, showing the positioning of the sensing mechanisms of the apparatus of FIG. 2 and their interconnection with a computer;

FIG. 15 is a flowchart of the operation of the cutting apparatus of FIG. 2;

FIG. 16 is a diagram of an example of one method of determining the number of slabs into which a fish body can be subdivided by the cutting apparatus of FIG. 2;

FIG. 17 is a flowchart of a method of subdividing a carcass into a number of slab sections in accordance with the invention;

FIG. 18 is a fragmentary perspective view of a tail section collection mechanism of the cutting apparatus of FIG. 2 showing the tail end scoop tray in collection and deposit positions; and FIG. 19 is a partial perspective view of another version of the feed mechanism of the cutting apparatus of the invention.

DESCRIPTION

Figure 1:
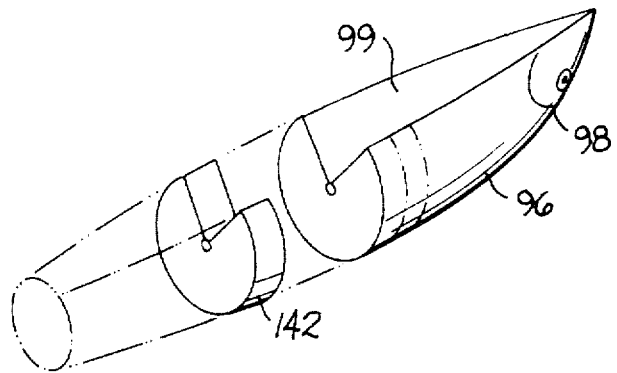
FIG. 1 is a perspective view, partly in phantom lines, of an eviscerated and skinned fish body as operated on by the cutting apparatus of the invention.

The invention provides a cutting apparatus for subdividing a carcass, such as a fish body, into individual slab sections as shown in FIG. 1. The apparatus, as shown in FIGS. 2–6, comprises a frame 20 supporting a carcass feed mechanism 22 and a cutting mechanism 24. The feed mechanism 22 transports a carcass along a transport path into position at the cutting mechanism 24, which severs an end portion from the carcass. The severed end portion of the carcass is conveyed away for further processing.

Figure 8:
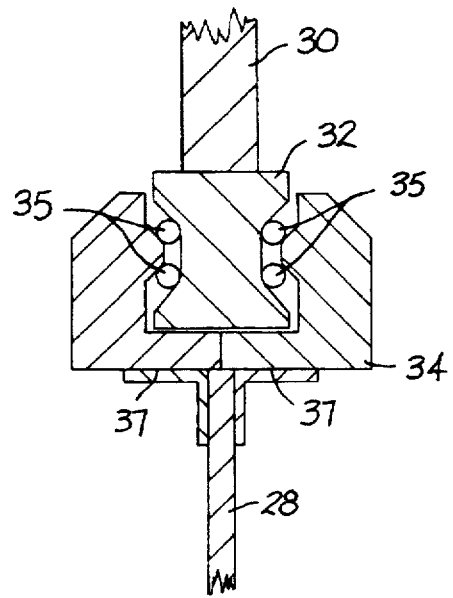
FIG. 8 is a cross-sectional view of the blade sliding mechanism taken along line 8—8 of FIG. 4.

The cutting mechanism 24 includes a blade assembly 25 comprising a blade 26 attached to a blade housing 28, which is, in turn, sidably attached to a blade support 30. As further shown in FIG. 8, a slide assembly 31 comprises a guide rail 32 fixed along the bottom of the blade support 30 and a pair of runner blocks 34 that slide along the guide rail. The runner blocks 34 and guide rail 32 include lubricated ball bearings 35 for low-friction sliding. The runner blocks 34 are attached to the upper sides of the blade housing 28 by L-brackets 37. In this way, the blade assembly 25 can slide back and forth along the guide rail 32.

The blade support 30 terminates on each side in tubular portions 36 having bushing inserts 38, which ride along a pair of vertical cylindrical rails 40 attached to a cutting mechanism frame 42. An air cylinder 44 mounted on top of the frame 42 has a pushrod 46 terminating in a coupling 48, which is fastened to the blade support 30 by a fastener such as a pin 50. The air cylinder 44 advances the blade assembly 25 up and down as illustrated by arrow 49 by extending and retracting the pushrod 46 under pneumatic pressure. Thus, the blade 26 advances along a cutting plane 51 defined by the blade edge 27 and the direction of its advance 49 and cuts on the down-stroke. The blade 26 could alternatively include a second edge 27' operable to cut on the up-stroke as the blade assembly 25 is raised. Preferably, the blade 26 has a smooth edge 27 to slice, rather than shear a carcass, thereby cutting cleanly without shredding and also eliminating kerf loss. As an alternative to the air cylinder 44, pushrod 46, and cylindrical rails 40, the blade support 30 could be raised and lowered by means of other mechanisms, such as motorized ball-screws or rack and pinion gears. Proximity switches 53, 55 mounted on the frame 42 act as upper and lower limit switches. When the blade assembly 25 is in an "up" position as in FIG. 2, the tubular portion 36 of the blade support 30 causes the upper limit switch 53 to close by its proximity. Similarly, when the blade assembly 25 is lowered as in FIG. 3, the proximity of the tubular portion 36 on the other side of the blade support 30 causes the lower limit switch 55 to close. For in-between positions of the blade assembly 25, the switches 53, 55 are both open.

A motor 52 is mounted on a mounting bracket 54, which is fastened to the blade support 30. The shaft of the motor is coupled to the blade 26 through a linkage 58 pivotally attached at one end by a pin 56 through the blade housing 28. The other end of the linkage 58 is eccentrically and pivotally attached to the shaft of the motor by a pin 60 joining the linkage 58 to a shaft-mounted retainer 62 through a hole offset from the axis of the shaft. In this way, the rotational motion of the shaft of the motor 52 is converted into linear translation of the blade assembly 25 by the linkage 58 acting as a crank. With such a crank mechanism and low-friction slide assembly 31, the blade assembly 25 can be reciprocated side-to-side as indicated by arrow 57 at relatively slow cutting speeds of below 600 Hz, or optionally at high cutting speeds of 10 kHz and above. It should be recognized that other drive means, such as air cylinders, could be used equivalently to motors to reciprocate the blade 26.

In an alternative version of the invention, shown in FIG. 11, an ultrasonic transducer 64 reciprocates a blade 66. As shown, the ultrasonic transducer 64 is coupled to the blade 66 so that the blade reciprocates in the direction of blade advancement indicated by two-headed arrow 68. It is also possible to reciprocate the blade laterally, just as for the motor-driven blade 26, perpendicular to the direction of the arrow 68. The ultrasonic transducer 64 can reciprocate the blade 66, which functions as the acoustic load, or horn, at speeds of up to 40 kHz for effective cutting. High-speed reciprocation, whether by ultrasonic transducer, air cylinder, or motor, of a smooth-edged blade is further desirable because it allows the cutting of partly thawed, soft-frozen, as well as harder frozen, carcasses, thereby diminishing the need for strict control of carcass temperature.

Figure 4:
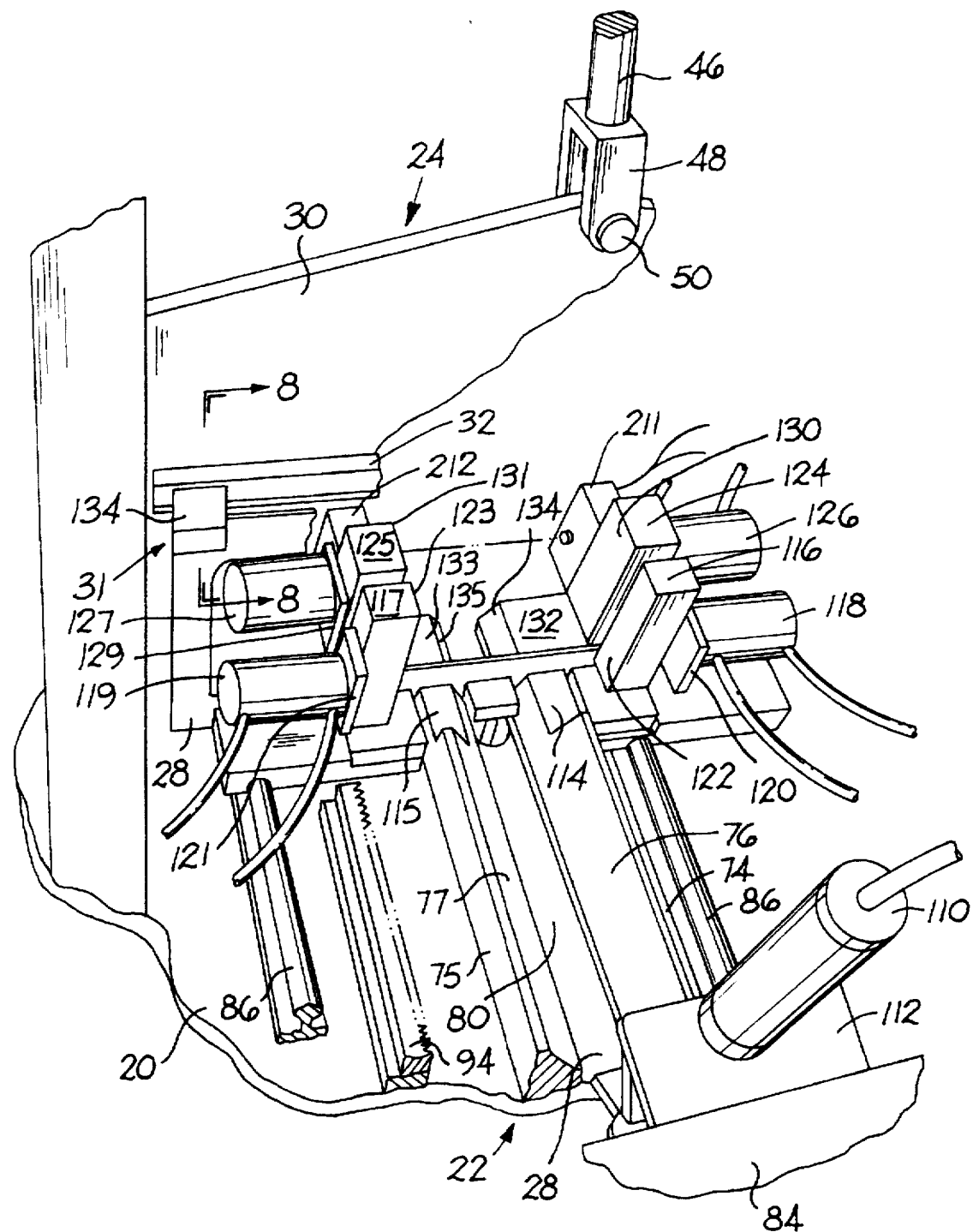
FIG. 4 is a fragmentary perspective view of the cutting apparatus of FIG. 2, further showing the feed mechanism.
Figure 6:
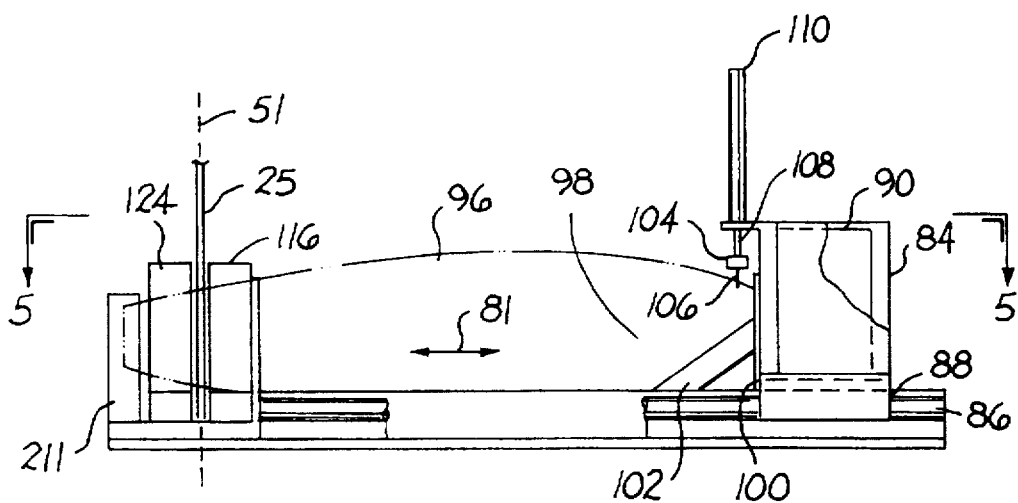
FIG. 6 is a partial side elevational view of the cutting apparatus of FIG. 2.
Figure 5:
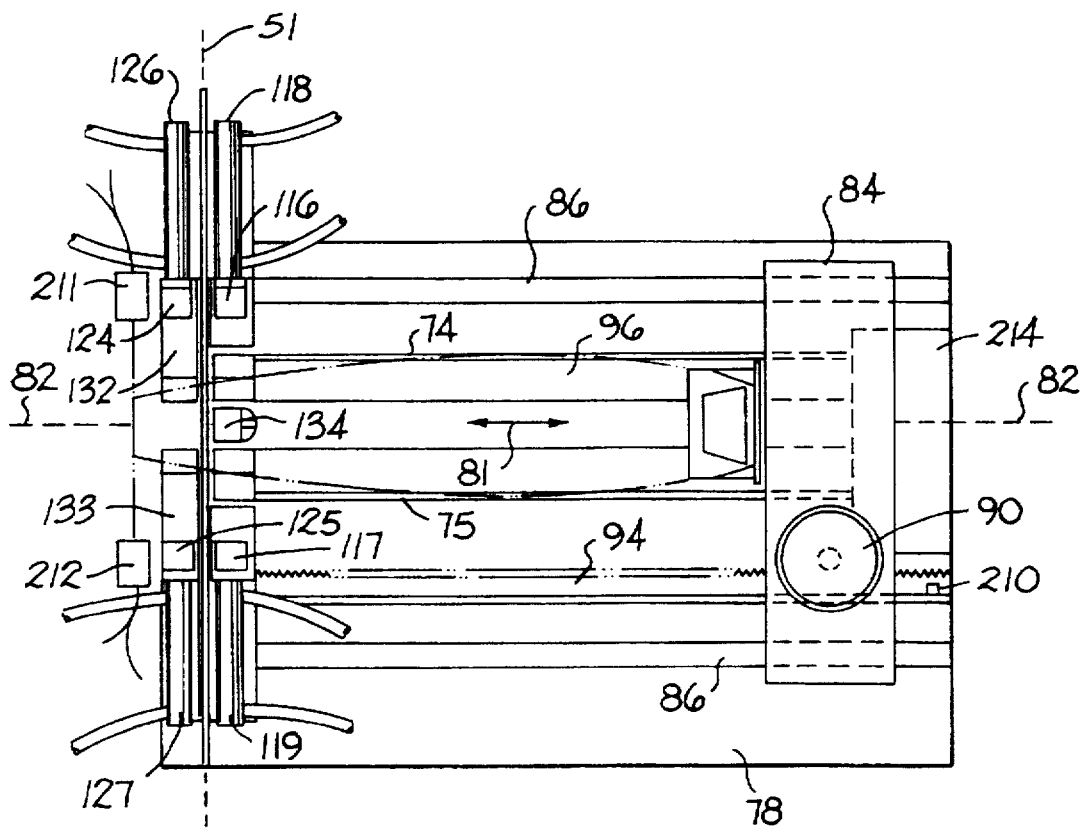
FIG. 5 is a plan view of the cutting apparatus of FIG. 2.
Figure 7:
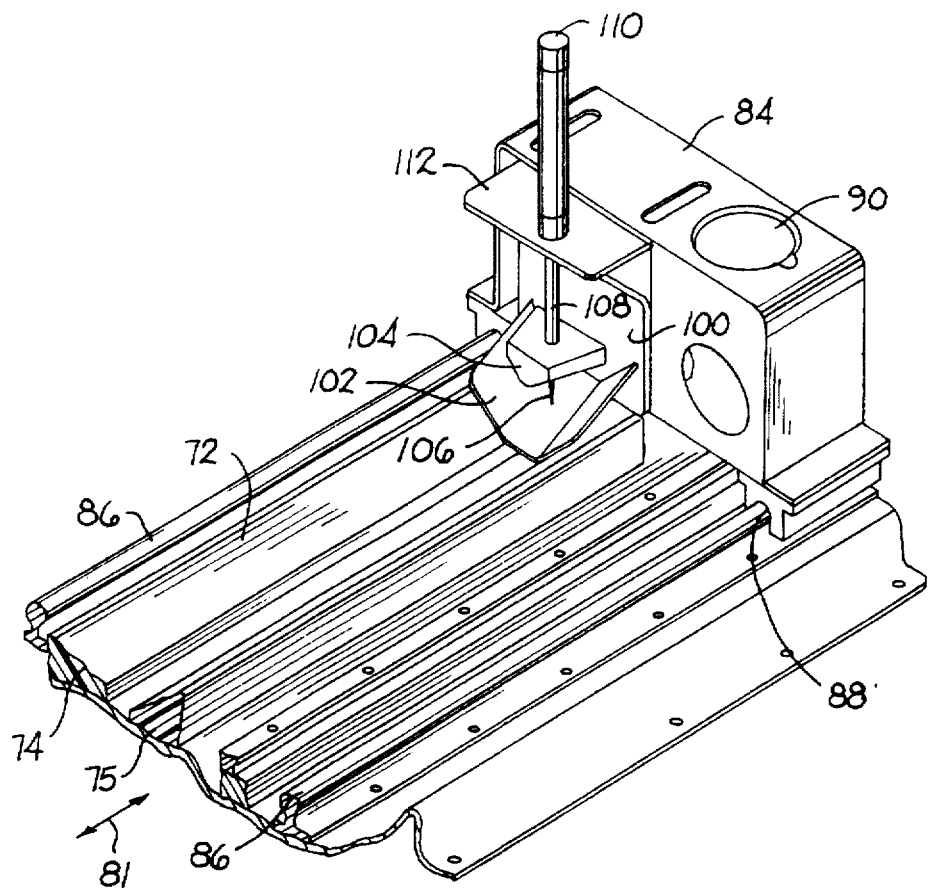
FIG. 7 is a fragmentary perspective view of the feed mechanism of the cutting apparatus of FIG. 2.

The feed mechanism 22 shown in FIGS. 4, 5, and 7 includes a feed track 72 formed of a pair of spaced apart guides 74, 75. The facing surfaces 76, 77 of the guides are angled outwardly and upwardly from a flat base 78 portion of the frame 20. The feed track 72 is in the form of a truncated V-shaped feed channel 80 between the surfaces 76, 77 of the guides 74, 75 and the base 78 to accommodate a carcass, such as a fish body. The feed track 72 defines a transport path 81 along a feed axis 82 extending along the length of the feed track and beyond. An alternative feed mechanism is shown in FIG. 19, in which an inverted V-shaped guide 71 is mounted to the base 78. The surfaces 73 of the guide conform to a slot 99 cut in the belly side of the eviscerated fish body 96 and provide support. The guide 71 can further be angled relative to the base to present the eviscerated fish body 96 as it is advanced along the guide in a proper orientation to the cutting mechanism 24.

A carriage 84, further shown in FIGS. 7 and 13, is supported by and rides along a pair of rails 86. The rails 86 are mounted on the base 78 parallel to the feed axis 82. The carriage 84 includes bushings 88 that surround the rails 86 and provide a bearing surface between the rails and the carriage. A motor 90, preferably a stepper motor, is mounted in the carriage 84 and has a pinion gear 92 extending from its shaft. The pinion gear 92 meshes with a rack gear 94 mounted on the base 78 parallel to the rails 86. The carriage 84 is advanced along the rails 86 by the motor 90 and the rack and pinion gear 94, 92. Because the gear ratio is known, the stepper motor 90 can advance the carriage 84 along the track in known increments defined by integral numbers of steps of the stepper motor. A proximity switch 210 mounted near the end of the feed track 72 opposite the cutting mechanism 24 defines a "home" position along the feed track for the carriage 84. The switch 210 detects the presence of a metal tag (not shown) mounted to the carriage 84.

A carcass, such as a fish body 96, is attached to the carriage 84 at one end, preferably the head end 98. The head end 98 abuts a faceplate 100. A cradle 102 extending downward and outward of the faceplate 100 between the guides 74, 75 of the feed track 72 supports the head end 98 of the fish body 96. The cradle 102 is adjustable up and down to accommodate fish bodies of varying sizes. A holddown 104 having one or more spikes 106 is attached to the end of a pushrod 108 extending from an air cylinder 110. The air cylinder is mounted on a flange 112 extending above the feed track 72 outward from the top of the carriage 84 so as to oppose the cradle 102 on the other side of the fish head end 98. The air cylinder 110, flange 112, faceplate 100, and cradle 102 can translate into an opening in the carriage 84. A spring 101 biases the faceplate 100 and its attachments against a stop plate 103 in the carriage 84. As the fish body 96 is loaded into position, it pushes the faceplate 100 to compress the spring 101 against the stop plate 103. A proximity switch 105 detects the loading of a fish body 96 by the recession of the faceplate 100 into the carriage 84. The pushrod 108 can then be advanced downward to retain the head end 98 in the cradle 102 and against the faceplate 100. The head retaining elements attached to the faceplate 100 can slide farther back toward the stop plate 103 against the spring 101 to accommodate the thickness of the blade 26 as it slices through the fish body. The spikes 106 ensure the secure retention necessary for accurate cutting. Thus, the carriage 84 includes a secure retainer for one end of the fish body 96, preferably the head 98.

At the end of the feed track 72 proximate the cutting plane 51, the guides 74, 75 have flat surfaces 114, 115 to support a first fish body holding clamp comprising a pair of opposing blocks 116, 117, each driven by an air cylinder 118, 119 and pushplate 120, 121. The opposing surfaces 122, 123 of the blocks 116, 117 can be angled to meet the surface of the fish body and knurled or otherwise textured to decrease slickness. A second slab holding clamp, comprising a similarly arranged pair of second opposing blocks 124, 125, air cylinders 126, 127, and pushplates 128, 129, is supported on the side of the cutting plane 51 opposite the first holding clamp. Facing surfaces 130, 131 of the blocks 124, 125 can likewise be angled and knurled. The second holding clamp blocks 124, 125 are supported by and slide along slab supports 132, 133 flanking the transport path 81 as it extends beyond the feed track 72. The slab supports 132, 133 have facing angled surfaces 134, 135 to accommodate a fish body. The slab supports 132, 133, aligned with the feed track 72, act as an extension of the feed track on the side of the cutting plane 51 opposite the feed track and further define the transport path 81 extended along the feed axis 82. The air cylinders 116, 117, 126, 127 can individually pivot about a vertical axis under spring tension (conventional pivots and springs not shown) to effect a peeling action of a slab from the fish body as the blade 26 cuts through. A light-emitting transmitter 211 and a light-sensitive receiver 212 face each other across the transport path 81 next to the second holding clamp blocks 124, 125. The transmitter 211 produces a light curtain across the transport path 81. Whenever the light curtain is occluded by more than a certain amount, such as by the presence of a fish body, the receiver 212 produces a signal indicating an occluding presence.

The air cylinders 118, 119, 126, 127 push the holding clamp blocks 116, 117, 124, 125 against a fish body on each side of the cutting plane 51 to support the carcass during slow-speed cutting, i.e., blade reciprocation at or below the resonant mechanical frequency of the carcass. For high-speed cutting, e.g., at 10 kHz and above, the inertia of the carcass is sufficient to withstand the high-speed reciprocation of the blade 26, and the holding clamp blocks 116, 117, 124, 125 may not be needed. Further support is provided by a movable pedestal 134 that supports the fish body from below. The support provided by the clamps for low-speed cutting allows for the cutting of fish bodies tempered over a wider range of temperatures from hard frozen to partly thawed, soft frozen. The movable pedestal 134 and the first holding clamp blocks 116, 117 restrain the fish body on three sides during cutting. The movable pedestal 134 is pushed into a supporting position by an air cylinder 137, whose pushrod 262 pushes a Z-shaped arm 143 through a ratchet 260, which provides the primary support for the pedestal. Another air cylinder 135 unlatches the pedestal 134 by the action of a push disk 264 against the ratchet 260. The air cylinders 135, 137 act on the Z-shaped arm 143 slidably mounted to the frame 20 at one end and fixed to the pedestal 134 at the other end with the ratchet 260 engaging the arm along a straight portion. A proximity switch 139 senses the position of the Z-shaped arm 143 attached to the movable pedestal 134 to determine whether or not it is in the unlatched, non-supporting position.

Figure 9A:
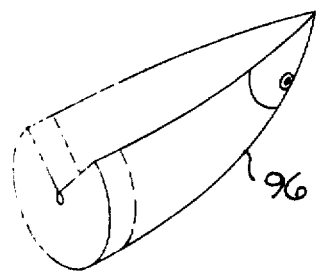
Figure 9B:
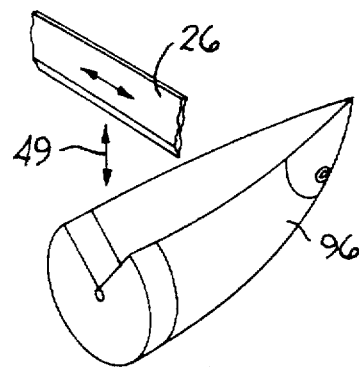
Figure 9B:
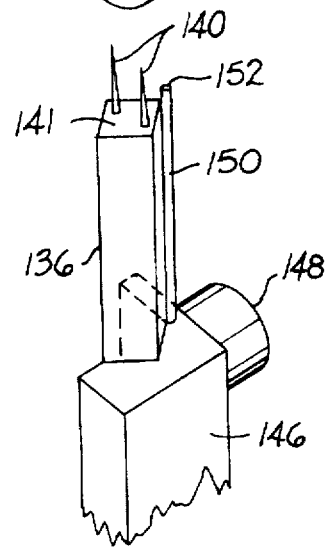

A transportable slab holder 136, which comprises a shaft 138 and two tapered prongs 140 extending from an end 141 of the shaft, is used to impale a severed slab 142 of the fish body 96 after cutting, as shown in FIGS. 9B and 10. The slab holder 136 is supported by a slab holder block 146 below the end of the fish body 96 to be severed from the slab 142. An air cylinder 148 extends a pushrod (not shown) through a hole in the block 146 to retain the holder 136 in place and retracts the pushrod to release the holder. A spring-loaded feeler rod 150 extends upward from the block 146 such that its upper end 152 is slightly above the level of the top end 141 of the slab holder shaft 138. The feeler rod 150 is used to detect the complete insertion of the holder prongs 140 into the slab 142. A normally-open proximity switch 149 in the block 146 closes when the feeler rod 150 begins to be pushed down, thereby indicating complete insertion of the prongs 140 into the slab 142. An air cylinder 153 has a pushrod 155 extending into the block 146. The pushrod 155 further extends to push the slab holder 136 into the slab 142. A slab support mechanism 280 (shown in FIGS. 9C and 10) comprising a wedge-shaped support element 282 at the end of a pushrod 284 of an air cylinder 286, engages the slab 142 opposite the holder 136 and supports the slab during insertion of the holder. A spike 290 extends from the support element 282 to pin the slab securely. The support mechanism 280 is attached by bolts or welds (not shown) to the cutting frame 42 by a support 288. An optical transmitter 157 mounted on one leg of the frame 42 continuously emits a light beam. Whenever a holder 136 is in place, it shades the beam from an optical receiver 159 mounted on the frame 42 across the holder. The shaded receiver sends an electrical signal indicating that a holder 136 is in position.

A grabbing mechanism 154, shown in FIGS. 9C–E and 10, includes a grabber 156 pivotally mounted at a pivot pin 166 to a runner block assembly 158 on a pneumatic conveyor 160 including a central rodless air cylinder 161. The runner block assembly 158 is driven along rails 162. An air cylinder 168 fixed to the end of the grabber 156 proximate the runner block assembly 158 opens and closes a pivotable grabber jaw 170 over a triangular opening 172 sized to mate with the side surfaces of the slab holder shaft 138. As the air cylinder 168 extends its pushrod 174, the jaw 170 pivots into a closed position about a pivot pin 176 to retain the slab holder 136 in place. A second air cylinder 178 attached at one end to the runner block 158 and at the other end to the grabber 156 retracts its pushrod to pivot the grabber counterclockwise and extends the pushrod to pivot the grabber clockwise about the pivot pin 166. Thus, the grabbing mechanism 154 is a means for carrying the severed slab 142 away from the cutting mechanism 24.

The slab holder 136 is moved into position in the slab holder block 146 by a gripper mechanism 180, as shown in FIGS. 9B and 10. The gripper mechanism 180 is driven along a rail system 182 that drags a runner block 184 along rails 186. The rail system 182 includes a hollow rodless cylinder 187. An air cylinder 188 attached to the runner block 184 has a pushbar 190 attached to a plate 192 to which a pneumatically controlled gripper jaw mechanism 194 is mounted. The jaws grip the prongs 140 of the slab holder 136. The rail system 182 and the air cylinder 188 and pushbar 190 guide and deposit the holder 136 in place in the holder block 146.

The collection mechanism shown in FIG. 18 is used to carry away severed sections of the fish body to a different processing station than the slabs conveyed by the grabbing mechanism 154. A pneumatic rail system 230, comprising a central rodless cylinder 232 and a pair of rails 234, is attached to a horizontal U-channel 236 extending outward of the frame 20. A runner block 238 rides along the rails 234 as driven by a magnetic assembly within the cylinder 232. A support plate 240 is fastened to the underside of the runner block 238. An air cylinder 242 is attached to the underside of the support plate 240 and pivotally connected by a pivot pin 244 positioned along an arm 246 of a scoop tray 248. The arm 246 is pivotally connected by a pivot pin 250 at an end of the support plate. The scoop tray 248 can be moved from a horizontal position to a vertical position by extending a pushrod 252 from the air cylinder 242 to pivot the tray about the pivot pin 250.

As shown in FIG. 12, a network of air cylinders is controlled by a programmable computer 196, such as a personal computer (PC) or a programmable logic controller (PLC) or both. A high-pressure air source 198 supplies the pneumatic pressure required to operate the air cylinders through air lines 199A-S and valves 202A-S. For clarity, only one valve 202A-S is shown for each air cylinder, when, in fact, two are often used—one to effect motion in one direction, the other in the opposite direction. (Air cylinders with spring return may also be used.) Each valve 202A-S is electrically controlled by an associated signal line 200A-S from the computer 196. In this case of the fish holding clamp blocks 116, 117 driven by air cylinders 118, 119, individual control valves 202L and 202M can be replaced by a single valve whose output is connected to both cylinders. In this way, balanced operation of the clamps is achieved. Similarly, the operation of slab holding clamp blocks 124, 125 is balanced by connecting their air cylinders 126, 127 to the output of a common valve, instead of to the individual valves 202K and 202N shown in FIG. 12. The functions of the air cylinders are listed in TABLE I.

TABLE I

FUNCTIONS OF AIR CYLINDERS

| REFERENCE NUMERAL | FUNCTION |
|---|---|
| 44 | raise/lower blade |
| 110 | retain/release head end of fish body |
| 118/119 | clamp/release fish body at blade |

TABLE I-continued

FUNCTIONS OF AIR CYLINDERS

| REFERENCE NUMERAL | FUNCTION |
|---|---|
| 126/127 | clamp/release fish slab at blade |
| 148 | retain/release slab holder in block |
| 161 | slide grabbing mechanism |
| 168 | open/close grabber jaw |
| 178 | pivot grabber |
| 187 | slide gripper |
| 188 | raise/lower gripper |
| 194 | retain/release gripper jaws |
| 153 | insert slab holder into slab |
| 137 | position support pedestal |
| 135 | unlatch support pedestal |
| 232 | slide tail end collector |
| 242 | drop tail end |
| 286 | support slab during holder insertion |

As shown in FIG. 12, the programmable computer 196 also controls the blade reciprocating motor 52 (or the ultrasonic transducer 64) and the carriage stepper motor 90 over electrical signal lines 204, 206. Thus, the computer 196 coordinates the cutting mechanism 24 with the feed mechanism 22.

As shown in FIG. 14, the programmable computer 196 senses various system conditions that indicate the state of the cutting apparatus. With knowledge of the state of the cutting apparatus, the computer 196 executing its program can better control the sequencing of the cutting operation with safety interlocks included. Signals indicating the various conditions are routed to the computer 196 over signal wires 208A-J. (In the case of optical transmitters 157 and 211, the computer 196 sends signals over the wires 208H and 208J to energize the transmitters.) The functions of the sensors are listed in TABLE II.

TABLE II

FUNCTIONS OF SENSORS

| REFERENCE NUMERAL | SENSED CONDITION | FUNCTION |
|---|---|---|
| 53 | blade support at raised position | blade upper limit (clear of fish body) |
| 55 | blade support at lowered position | blade lower limit (cut through fish body) |
| 105 | faceplate recessed into carriage | fish body loaded into carriage |
| 211/212 | fish end intersecting light curtain | end of fish body detected |
| 149 | feeler rod starting to retract | holder inserted in slab |
| 157/159 | holder in place below slab | holder in place below slab |
| 139 | movable pedestal arm unlatched | movable pedestal not in support position |
| 210 | carriage assembly at "home" position along feed track | carriage at "home" |

In use, the preferred version of the cutting apparatus operates, as controlled by the programmable computer 196, according to the flowchart of FIG. 15. First, the carriage 84 is moved to the "home" position along the feed track 72 by the stepper motor 90. The "home" proximity switch 210 indicates to the computer 196 that the carriage 84 is at "home." Once the carriage is in the "home" position, the holddown retainer air cylinder 110 retracts its pushrod 108 to release the remaining fish head end 98 retained by the holddown 104. The remaining head end 98 drops through an opening 214 in the base 78 for processing. Next, the blade assembly 25 is raised by the air cylinder 44 until the blade support 30 reaches the position of the upper limit switch 53, which then signals the computer 196 that the blade assembly is at its uppermost rest position. With the fish carriage 84 at "home," a frozen or partly frozen fish body 96, typically eviscerated, skinned, and finless, is loaded into the channel 80, preferably with its belly up and its head end 98 abutting the faceplate 100 of the carriage and its backbone aligned longitudinally along the feed axis 82. During loading, the faceplate 100 shown in FIG. 13 is pushed into the carriage 84 against the stop plate 103 at which point the proximity switch 105 indicates the fish body 96 is loaded. Once the fish body 98 is loaded, the computer 196 sends a signal to the air cylinder 110 to push the holddown 104 and its spikes 106 into the fish end 98 to retain it securely. As an alternative to the automated loading just described, a manual load switch could be provided for use by an operator to activate the air cylinder 110 to retain the fish end 98 and complete the loading process.

With the fish body 96 confined in the feed channel 80 and retained by the carriage 84, the carriage and the retained fish body are transported from the known "home" position along the feed track 72 toward the cutting mechanism 24. As soon as the tail end of the fish body 96 pierces the light curtain produced by the optical transmitter 211, the receiver 212 signals the computer to halt the carriage's stepper motor 90. By keeping track of the number of pulse signals, or steps, sent to the stepper motor 90, and with "knowledge" of the fixed distance between "home" and the light curtain and by using a standard length for the head portion, the computer 196 can compute the number of slabs into which the fish body 96 can be subdivided. As diagrammed in FIG. 16, for a distance C between "home" and the light curtain, a desired slab thickness S, a head length H, a minimum tail thickness $T_{min}$, and a transport distance D that the carriage 84 moved from "home" until the light curtain is pierced by the tail end, the number of slabs N of uniform thickness that can be cut from the fish body 96 is given by: $N=(C-D-H-T_{min})/S$, where N is the integer portion of the quotient. The length of the resulting tail section T is given by: $T=(C-D-H-N-S)$. Of course, criteria other than uniform slab thickness, as in this example, could be used to determine where to position the cuts. It is simply a matter of reprogramming the computer 196, rather than of disassembling and rearranging hardware structures. Furthermore, the head length H could be derived as a function of the measured length of the fish body (C–D).

Next, the fish body 96 is transported along the feed track 72 into the cutting position intersected by the cutting plane 51. The computer 196 sends the computed number of pulses to the stepper motor 90 to move the carriage 84 for the cut. Once the fish body 56 is stopped in position for the cut, the computer 196 signals air cylinders 118, 119, 126, 127 to push the holding clamp blocks 116, 117, 124, 125 against the fish body 96. (For high-speed blade reciprocation, this clamping step may not be necessary.) The pedestal position air cylinder 137 advances the movable pedestal 134 into a supporting position beneath the fish body 96 and supported by the ratchet 260. The holder 136 is then moved into position at the slab holder block 146 by the grabbing mechanism 154. The presence of the holder 136 is detected by the optical transmitter 157 and optical receiver 159 in tandem.

With the fish body 96 in position for cutting, the blade assembly 25 is lowered by the air cylinder 44 while the blade 26 is reciprocated to cut through the fish body as shown in FIGS. 9A–B. Once the blade 26 cuts completely through the fish body 96, the lower limit switch 55 detects the lowered position of the blade support 30, and the blade is stopped.

Next, the blade assembly 25 is raised by the air cylinder 44 until the blade support 30 reaches the position of the upper limit switch 53, which then signals the computer 196 that the blade assembly is in its uppermost rest position. While the slab support air cylinder 286 pushes the support element 282 into position against the slab 142, the slab holder insertion air cylinder 153 pushes the slab holder 136 into the severed slab 142. Just before complete insertion of the prongs 140, the feeler rod 150 begins to be pushed down into the holder block 146, which causes the proximity switch 149 to indicate by signal to the computer 196 that the holder is in place and that further insertion can stop. The slab support element 282 is then retracted. With the fish body 96 loaded uniformly into the feed channel 80, for example, belly up, and held firmly by the holddown 104 of the carriage 84, the holders 136 are always inserted into the slabs 142 in the same orientation relative to the skeletal and meat structure of the fish body. Because the holders 136 are used in registering the fish slabs 142 during downstream processing, their relative placement in the slabs can be critical in reducing the amount of downstream processing required to re-orient the slabs 142 to a known position. The computer 196 then signals air cylinders 118, 119, 126, 127 to release the holding clamp blocks 116, 117, 124, 125 and the support pedestal unlatch air cylinder 135 to unlatch the ratchet 260 to release the movable pedestal 134.

To more effectively process subdivided fish slab sections, the computer 196 is programmed to route the first slab section 142 severed from each fish body 96 to a separate processing station from that for the inner slabs because the first slab is the tail end portion, which requires different processing. The tail end 266 of the slab, as shown in FIG. 18, is deposited in a different processing station than the inner slabs 142. After the first cut is made in a fish body 96, the tail end section 266 is retained by the holder blocks 124, 125. The scoop tray 248 is moved into position adjacent the blocks 124, 125 by the pneumatic rail system 230. The blocks 124, 125 are then released and the remaining fish section 268 transported forward for the next cut. As the fish section 268 is moved into position, it knocks the tail end 266 into the tray 248. The tray 248 is then carried along the rails 234 as indicated by arrow 270. When the tray 248 reaches the other end of the rails 234, as indicated by the dashed lines, the pushrod 252 of the air cylinder 242 is extended causing the arm 246 to pivot about pin 250 toward the horizontal so that the tail end portion 266 falls from the tray 248 to a conveyor (not shown) below for special processing.

Figure 9C:
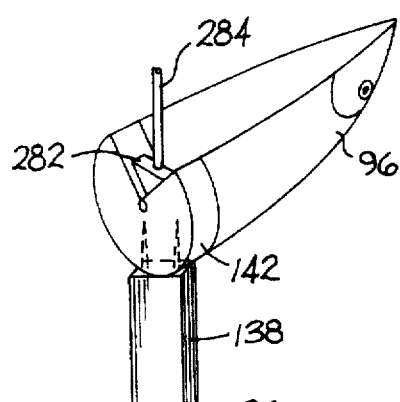
Figure 9C:
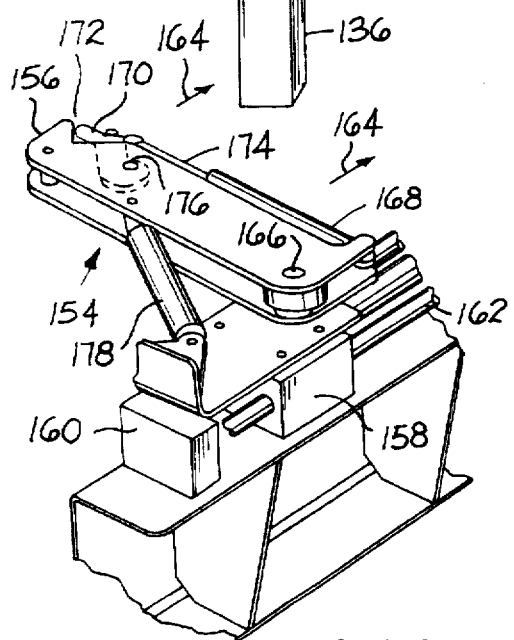
Figure 9D:
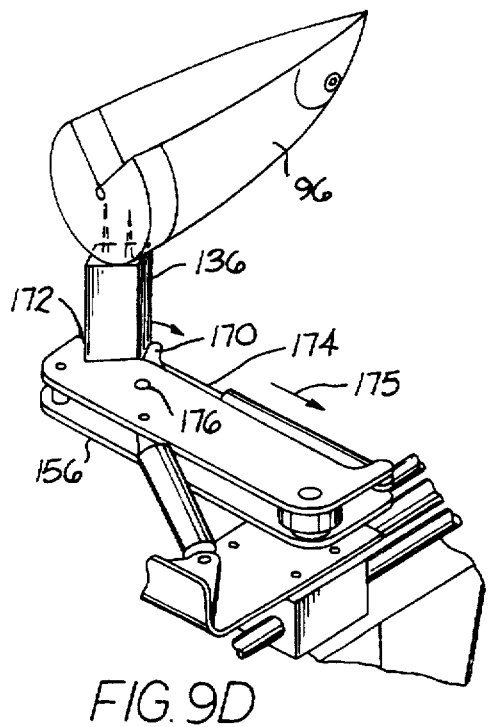
Figure 9E:
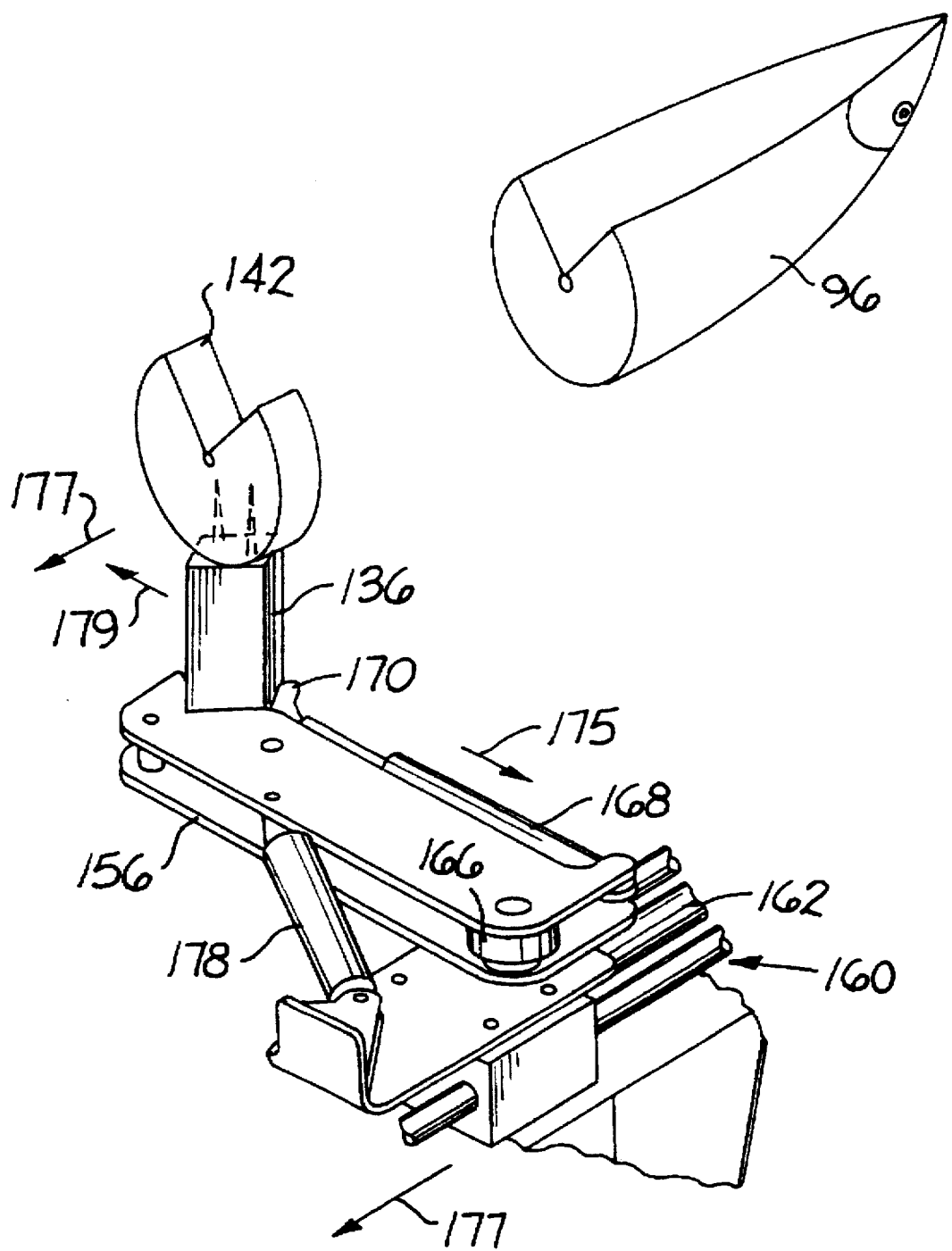

As shown in sequence in FIGS. 9C–E, the inner slabs are carried away by the grabbing mechanism 154 on the pneumatic conveyor 160. The grabber 156 slides into position above the holder block 146 as indicated by arrows 164. The grabber jaw 170 is opened by the air cylinder 168, which retracts its pushrod 174 in the direction of arrow 175, to allow the triangular opening 172 of the grabber 156 to engage the holder shaft 138 on two sides. The jaw air cylinder 168 then closes the jaw 170 around the holder shaft 138. The holder block air cylinder 148 then releases the holder 136 so that it and the severed slab 142 can be conveyed away in the direction of arrows 177 by the pneumatic conveyor 160 for further processing. Once moved from the cutting position, the slab 142 and holder 136 are released by the grabber 156. The grabber air cylinder 178 causes the grabber to pivot counterclockwise about the pivot pin 166 so that, when the jaw 170 is opened by the air cylinder 168 to release the slab 142 and holder 136, they can be dropped into place on a conveying system (not shown) oriented perpendicular to the rails 162 of the grabber's pneumatic conveyor 160 and carried off in the direction of arrow 179. If the slab 142 carried away is the last slab to be severed from the fish body 96, the process flow returns to the step of moving the carriage 84 to the "home" position and restarting the cutting of another fish body. Otherwise, the process flow resumes with the step of transporting the fish body 96 along the track 72 by a distance equal to the thickness of the next slab to be severed.

A more general flowchart of the method of the invention is shown in FIG. 17. The critical steps in the method include: a) loading a carcass into the feed channel; b) transporting the carcass along the feed channel into a stationary cutting position; c) advancing a cutting blade along a cutting plane intersecting the carcass to sever a slab section from the carcass; and d) carrying the severed slab section away from the cutting position in a known orientation. Steps b)–d) are repeated until the carcass is subdivided into a predetermined number of slab sections.

Optional steps, which are shown in dashed boxes in FIG. 17, include: measuring the length of the carcass in the channel after the carcass is loaded into the channel and determining the number of slab sections into which the carcass can be subdivided as a function of the length of the carcass and slab thickness criteria, as illustrated in FIG. 16.

Another optional step is routing the first slab section and the remaining carcass after all slabs have been severed to different processing stations. This is especially useful in the case of tuna processing in which the first slab section is the rapidly tapered tail section, which is difficult to process in the same way as the more circularly cylindrical inner slabs, and in which the remaining portion includes the head, which includes horn meat and other anatomical structures different from those of the slabs.

A further optional step includes attaching slab holders to the sections cut from the carcass at the same relative positions before being carried away with the slab sections. For use especially with slow-speed blade reciprocation, the step of securing the carcass in the vicinity of the cut with holding clamps before advancing the blade to sever the slab from the carcass and the step of releasing the carcass and severed slab after cutting can be added. Other optional steps, such as those in FIG. 15 according to the versions of the invention specifically described to this point, may also be included.

Thus, the invention provides apparatus and methods for subdividing a carcass, such as a fish body, into a plurality of slab sections in preparation for further downstream processing, while at least fulfilling the needs and providing the specific features and advantages pointed out herein.

Although the present invention has been described in considerable detail with reference to certain preferred versions, other versions are possible. For example, other kinds of holding devices, such as non-impaling devices that grip the fish slab around its peripheral girth or on the flat sides so as not to obstruct subsequent imaging and cutting, could be used. Furthermore, different kinds of sensors could be used in different positions to sense the state of the system. For example, normally-open proximity switches could be replaced by normally-closed switches and the positions of optical transmitter/receiver pairs could be switched. Alternatively, sensors could be eliminated, although with some sacrifice in fail-safe protection. In addition to fish bodies, pieces of meat or other foodstuffs could be subdivided into sections with the cutting apparatus. Furthermore, the cutting plane could be oriented at an angle other than perpendicular to the feed track to produce bias-cut slabs. Therefore, the spirit and scope of the appended claims should not be limited to the description of the preferred versions contained herein.

What is claimed is:

1. A fish cutting apparatus for subdividing a fish body into slab sections, comprising:
    a frame;
    a feed track mounted on the frame defining a transport path and including means for aligning a fish body longitudinally along the transport path;
    a cutting mechanism at an end of the feed track for cutting along a cutting plane crossing the transport path;
    means for sequentially transporting the fish body in preselected increments along the feed track into a stationary cutting position intersecting the cutting plane;
    means for coordinating the cutting mechanism with the means for sequentially transporting to cut through the stationary fish body along the cutting plane when the fish body is sequentially transported into the cutting position in preselected increments, the cutting mechanism thereby sequentially subdividing the longitudinally aligned fish body into slab sections; and
    means for attaching a registrable holder to the subdivided slab sections in the same orientation relative to the skeletal or meat structure of the fish body for all the slab sections to permit the slab sections to be retained in registration in downstream processing.

2. The fish cutting apparatus of claim 1 wherein the cutting mechanism comprises a blade and means for reciprocating the blade in the cutting plane.

3. The fish cutting apparatus of claim 1 further comprising a first holding clamp disposed at the end of the feed track proximate the cutting plane and a second holding clamp disposed proximate the cutting plane on the side of the cutting plane opposite the first holding clamp, the first and second holding clamps laterally engaging the fish body on opposite sides of the cutting plane during cutting to support the fish body during cutting.

4. The fish cutting apparatus of claim 2 wherein the means for reciprocating comprises a motor having a shaft and further comprises a linkage coupling the shaft to the blade and converting the rotational motion of the shaft into reciprocation of the blade in the cutting plane as the motor is driven.

5. The fish cutting apparatus of claim 2 wherein the cutting mechanism further comprises a blade housing for holding the blade, the blade housing being connected directly to the means for reciprocating.

6. The fish cutting apparatus of claim 2 wherein the cutting mechanism comprises means for raising and lowering the blade vertically in the cutting plane, the blade being slidably coupled to the means for raising and lowering.

7. The fish cutting apparatus of claim 2 wherein the blade is a smooth-edged blade.

8. The fish cutting apparatus of claim 1 wherein the frame comprises a generally flat base and the means for aligning comprises a pair of parallel, spaced apart guides attached to the base, the guides having facing surfaces forming a channel to retain a fish body between the guides in longitudinal alignment along the channel.

9. The fish cutting apparatus of claim 8 wherein the facing surfaces of the guides are angled outward and upward from the base to form a truncated V-shaped channel.

10. The fish cutting apparatus of claim 1 wherein the frame comprises a generally flat base and the means for aligning comprises an inverted V-shaped guide attached to the base.

11. The fish cutting apparatus of claim 10 wherein the inverted V-shaped guide is angled relative to the base.

12. The fish cutting apparatus of claim 1 wherein the means for sequentially transporting the fish body comprises a pair of rails attached to the frame and parallel to the transport path, a toothed rack attached to the frame and parallel to the transport path, and a carriage for riding along the rails, the carriage including a motor and a pinion gear coupled to the motor shaft and engaging the toothed rack for transporting the carriage along the rails.

13. The fish cutting apparatus of claim 1 further comprising a fish end retainer movable with the means for transporting.

14. The fish cutting apparatus of claim 13 wherein the fish end retainer includes a faceplate having an abutment surface for abutting an end of a fish body positioned in the feed track, the abutment surface disposed to intersect the longitudinal axis of the fish body, a cradle extending from the abutment surface of the faceplate along the transport path for supporting an end of the fish body, a holddown disposed opposite the cradle, and means for moving the holddown into and out of holding engagement with the end of a fish body abutting the faceplate.

15. The fish cutting apparatus of claim 1 wherein the cutting mechanism comprises two oppositely directed blade edges and means for advancing the blade edges bidirectionally in the cutting plane to cut the fish body in the cutting position from either of two opposite directions.

16. A fish cutting apparatus for subdividing a fish body into slab sections, comprising:
a frame;
a feed track mounted on the frame defining a transport path and including means for aligning a fish body longitudinally along the transport path;
a cutting mechanism at an end of the feed track for cutting along a cutting plane crossing the transport path, the cutting mechanism including a blade and an ultrasonic transducer coupled to the blade to cause it to reciprocate in the cutting plane;
means for sequentially transporting the fish body in preselected increments along the feed track into a cutting position intersecting the cutting plane; and
means for coordinating the cutting mechanism with the means for sequentially transporting to cut through the fish body along the cutting plane when the fish body is sequentially transported into the cutting position in preselected increments, the cutting mechanism thereby sequentially subdividing the longitudinally aligned fish body into slab sections.

17. The fish cutting apparatus of claim 16 wherein the means for coordinating comprises a programmable computer.

18. The fish cutting apparatus of claim 16 further comprising a first sensor adjacent the transport path for sensing an end of the fish body.

19. The fish cutting apparatus of claim 16 further comprising a first sensor disposed on the side of the cutting plane opposite the feed track for sensing an end of the fish body and a second sensor for sensing the position of the means for transporting at a predefined home position along the feed track.

20. The fish cutting apparatus of claim 16 further comprising means for attaching a slab holder to the slabs cut from the fish body at substantially the same relative position on all slabs.

21. The fish cutting apparatus of claim 16 wherein the cutting plane is oriented substantially perpendicular to the transport path.

22. The fish cutting apparatus of claim 16 wherein the fish body is in a partly frozen state during cutting.

23. The fish cutting apparatus of claim 16 wherein the means for transporting sequentially transports the fish body in preselected increments of substantially uniform distance into the cutting position to be cut by the cutting mechanism into slabs of substantially uniform thickness.

24. The fish cutting apparatus of claim 16 further comprising means for measuring the length of the fish body in the feed track.

25. A cutting apparatus for cutting sections from a carcass, comprising:
a frame;
a feed track including spaced apart guides mounted on the frame forming a feed channel along a feed axis, the guides contacting and orienting a carcass in a preferred orientation relative to the feed axis;
a cutting mechanism at an end of the feed track including a blade and means for advancing the blade in a direction for cutting along a cutting plane intersecting the feed axis;
feeding means for alternately transporting the carcass along the feed track a preselected distance and positioning the carcass in the preferred orientation into a stationary cutting position intersecting the cutting plane, the means for advancing the blade being operable to advance the blade along the cutting plane when the carcass is positioned in the stationary cutting position in the preferred orientation to cut from the carcass a section having a thickness determined by the preselected distance of transport along the feed track; and
means for attaching a registrable holder to the cut sections in the same orientation relative to the skeletal or meat structure of the carcass for all the sections to permit the sections to be retained in registration in downstream processing.

26. The cutting apparatus of claim 25 wherein the cutting mechanism comprises means for reciprocating the blade in the cutting plane.

27. The cutting apparatus of claim 25 wherein the blade is a smooth-edged blade.

28. The cutting apparatus of claim 25 further comprising a retainer movable with the feeding means for retaining an end of the carcass.

29. The cutting apparatus of claim 25 wherein the cutting plane is oriented substantially perpendicular to the feed axis.

30. The cutting apparatus of claim 25 wherein the feeding means sequentially transports the carcass a uniform preselected distance into the cutting position to be cut by the cutting mechanism into slabs of substantially uniform thickness.

31. The cutting apparatus of claim 25 wherein the blade includes two oppositely directed blade edges and wherein the means for advancing the blade is operable to advance the blade bidirectionally in the cutting plane to cut the carcass in the cutting position from either of two opposite directions.

32. The cutting apparatus of claim 25 further comprising means for measuring the length along the feed axis of the carcass confined in the feed track.

33. A method for subdividing a fish body into slab sections, comprising the steps of:
a) loading a fish body along a transport path;
b) orienting and maintaining the fish body in longitudinal alignment along the transport path;
c) transporting the longitudinally aligned fish body along the transport path into a stationary cutting position;

d) advancing a cutting blade along a cutting plane intersecting the stationary fish body in the cutting position to sever a slab section from the longitudinally aligned fish body;

e) attaching a registrable holder to the severed slab section in a known orientation relative to the skeletal structure of the fish body:

f) carrying the severed slab section and the attached registrable holder away from the cutting position in the known orientation to a downstream processing station; and g) repeating steps c), d), e) and f) until the fish body is subdivided into a predetermined number of slab sections.

34. The method of claim 33 further comprising, before step b), the steps of:

measuring the length of the fish body along the transport path; and determining the number of slab sections to subdivide the fish into as a function of the length of the fish body and the slab thickness.

35. The method of claim 33 further comprising the step of routing the first slab section severed from the fish body and the remainder of the fish body after the predetermined number of slab sections have been severed to different processing stations from the other slab sections.

36. The method of claim 33 wherein, in step e), the registrable holder is attached to the slab section by insertion into the slab section in the vicinity of the backbone.

37. The method of claim 33 further comprising, before step d), the step of:

positioning holding clamps at least partly around the fish body in the stationary cutting position on both sides of the cutting plane to support the fish body in the vicinity of the cutting plane as the slab section is severed;

and, after step d), the step of:

releasing the holding clamps to free the fish body and the severed slab section.

38. The method of claim 33 further comprising, in step a), the substep of:

releasably securing one end of the fish body to a carriage for transporting the fish body along the transport path.

39. The method of claim 33 wherein, in step b), after the first slab section is severed, the fish body is transported along the transport path into the cutting position in uniform increments so that the fish body is subdivided into slabs of uniform thickness.

* * * * *